(12) United States Patent
Ratnakaram et al.

(10) Patent No.: US 11,962,706 B2
(45) Date of Patent: Apr. 16, 2024

(54) HOSTING ACCOUNT LINKING SERVICES TO ENABLE DYNAMIC AUTHENTICATION AND MULTI-COMPUTER EVENT PROCESSING

(71) Applicant: Bank of America Corporation, Charlotte, NC (US)

(72) Inventors: Udaya Kumar Raju Ratnakaram, Telangana (IN); Srilaxmi Sreepalli, Hyderabad (IN); Bhagya Lakshmi Sudha Lavanya Mallidi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 257 days.

(21) Appl. No.: 17/665,696

(22) Filed: Feb. 7, 2022

(65) Prior Publication Data

US 2023/0254152 A1 Aug. 10, 2023

(51) Int. Cl.
*H04L 9/32* (2006.01)
*G06Q 20/20* (2012.01)
*H04L 9/40* (2022.01)

(52) U.S. Cl.
CPC ......... *H04L 9/3236* (2013.01); *G06Q 20/202* (2013.01); *H04L 63/08* (2013.01)

(58) Field of Classification Search
CPC .......... H04L 9/32; H04L 9/3236; H04L 64/08
See application file for complete search history.

(56) References Cited

U.S. PATENT DOCUMENTS

| | | | |
|---|---|---|---|
| 9,692,747 B2 | 6/2017 | Bailey et al. | |
| 10,354,240 B2 | 7/2019 | Purves et al. | |
| 10,917,694 B2 | 2/2021 | Cronk et al. | |
| 11,101,041 B2 | 8/2021 | Ivanoff et al. | |
| 2006/0122931 A1 | 6/2006 | Walker et al. | |
| 2006/0177061 A1* | 8/2006 | Orsini .................. | H04L 67/108 380/247 |
| 2012/0310826 A1 | 12/2012 | Chatterjee | |

(Continued)

OTHER PUBLICATIONS

Oct. 14, 2022—U.S. Non-Final Office Action—U.S. Appl. No. 17/665,690.

(Continued)

*Primary Examiner* — Jonathan A Bui
(74) *Attorney, Agent, or Firm* — Banner & Witcoff, Ltd.

(57) ABSTRACT

Arrangements for account linking and dynamic device selection are provided. Registration data including one or more user accounts and/or payment devices may be received. A request to process a transaction may be received via a first device. User data may be retrieved to identify other devices. One or more external entities may provide user profile data including raw customer data and encrypted authentication data. A hash of the encrypted authentication data may be generated and stored. The system may dynamically generate a rendering displaying one or more payment devices available for selection. A second payment device may be selected and a handshake protocol initiated between a vendor device and a user device. Authentication data may be provided and a hash generated. The hashes may be compared and, if a match occurs, the transaction may be processed.

21 Claims, 26 Drawing Sheets

(56) References Cited

U.S. PATENT DOCUMENTS

| | | | |
|---|---|---|---|
| 2015/0287017 A1* | 10/2015 | Iqbal | G06Q 20/3223 |
| | | | 705/44 |
| 2015/0310431 A1 | 10/2015 | Lakshmanan et al. | |
| 2018/0005238 A1 | 1/2018 | Hammad et al. | |
| 2018/0101847 A1* | 4/2018 | Pisut, IV | G06Q 20/40145 |
| 2018/0108008 A1 | 4/2018 | Chumbley | |
| 2018/0336754 A1 | 11/2018 | Giobbi | |
| 2019/0156313 A1 | 5/2019 | Persaud et al. | |
| 2021/0398114 A1* | 12/2021 | Mossoba | G06Q 20/4014 |

OTHER PUBLICATIONS

Huang, et al., "A Secure Mobile Shopping System Based on Credit Card Transactions," 2014 International Conference on Intelligent Networking and Collaborative Systems, 2014, pp. 336-341, doi: 10.1109/INCoS.2014.87. (Year:2014).

May 5, 2023—U.S. Final Office Action—U.S. Appl. No. 17/665,690.

Dec. 14, 2023—(US) Non-Final Office Action—U.S. Appl. No. 17/665,690.

* cited by examiner

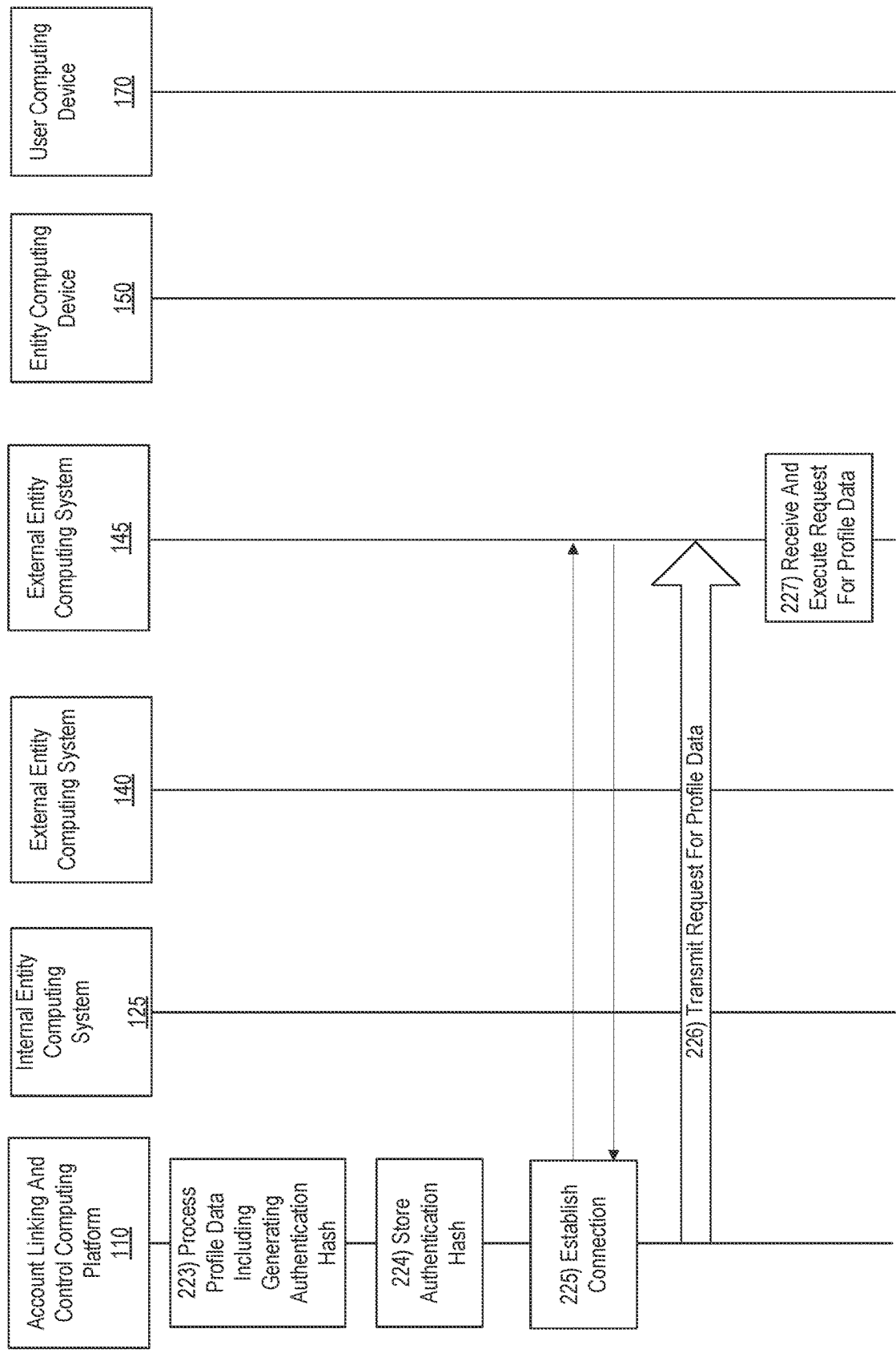

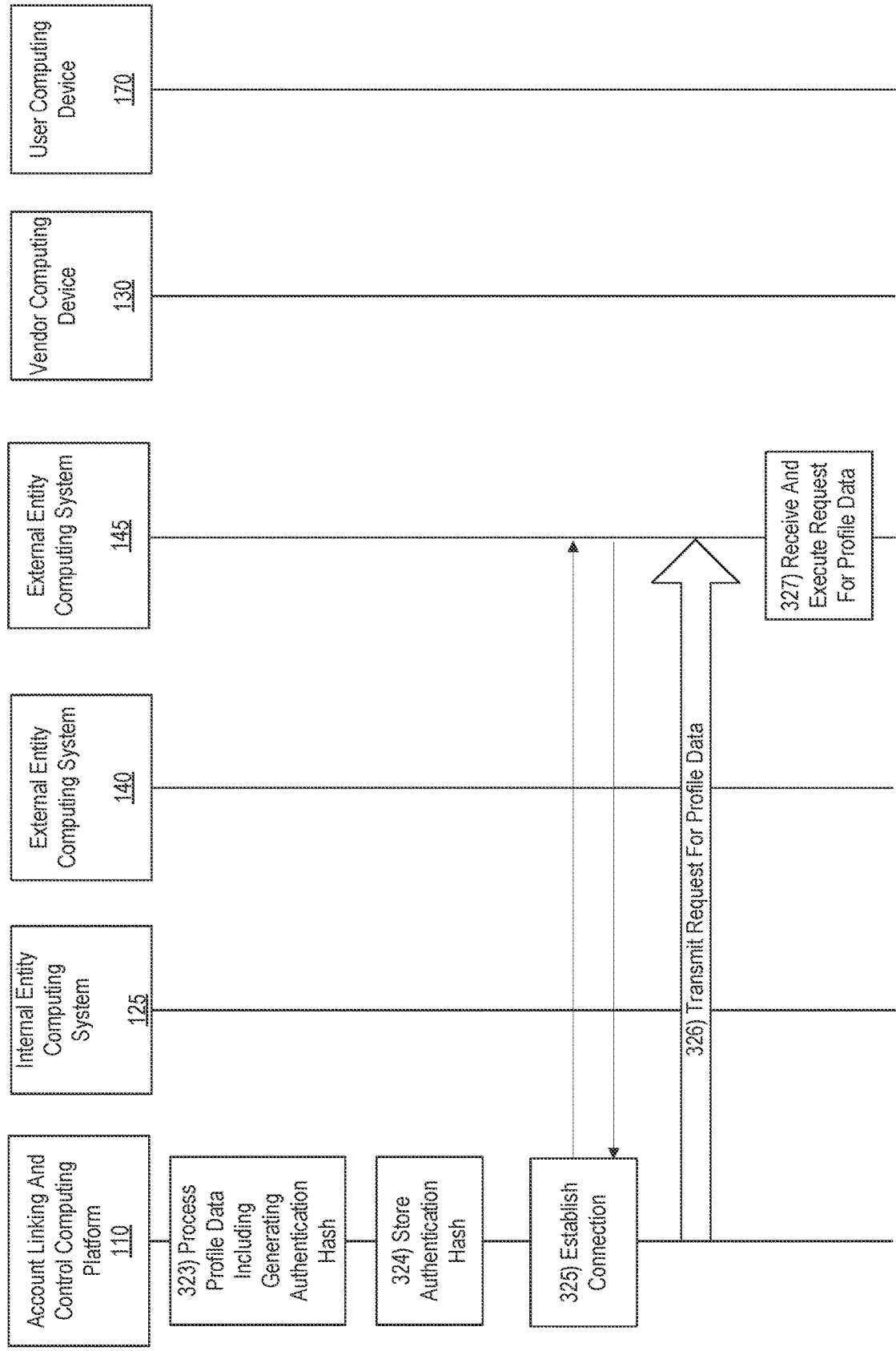

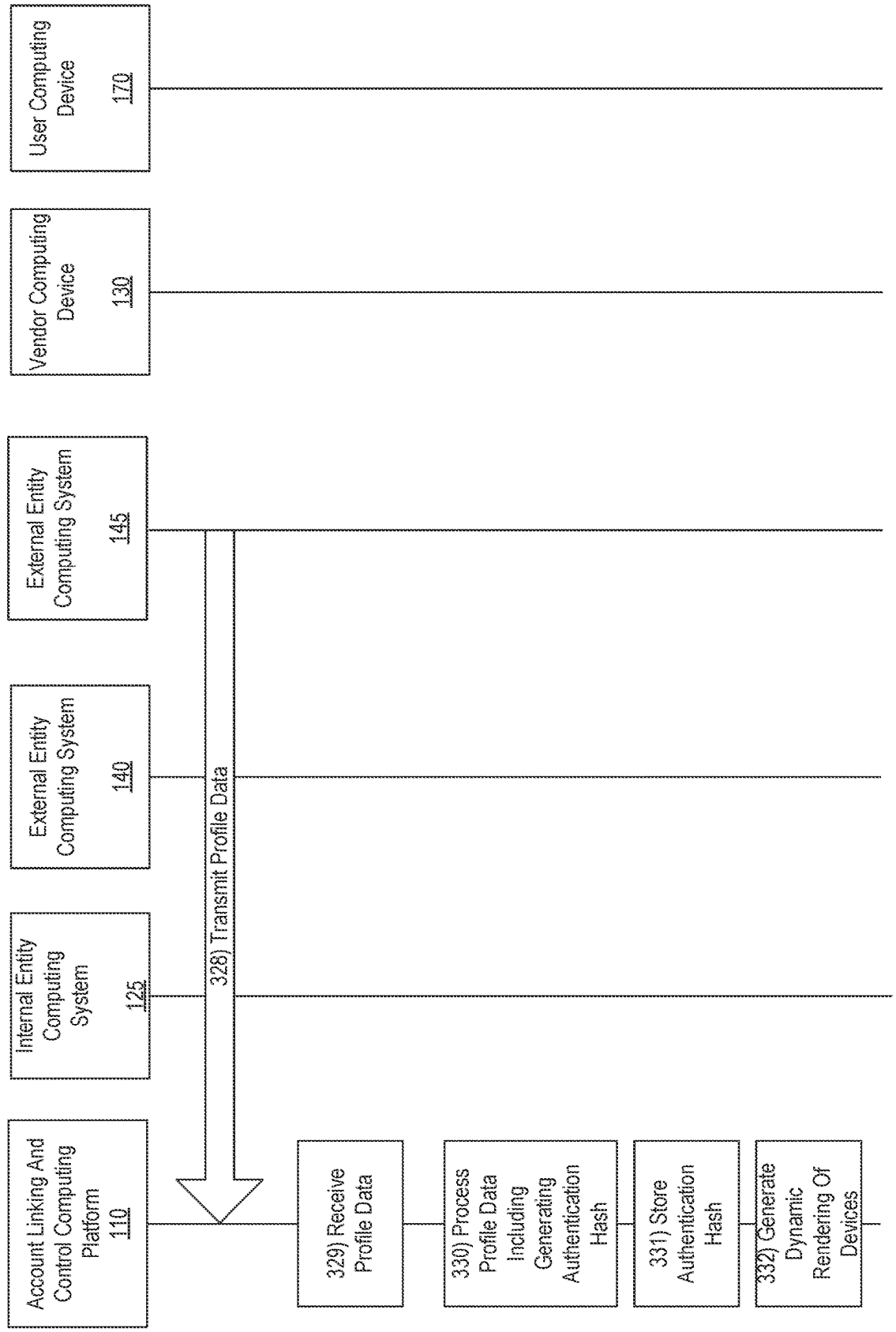

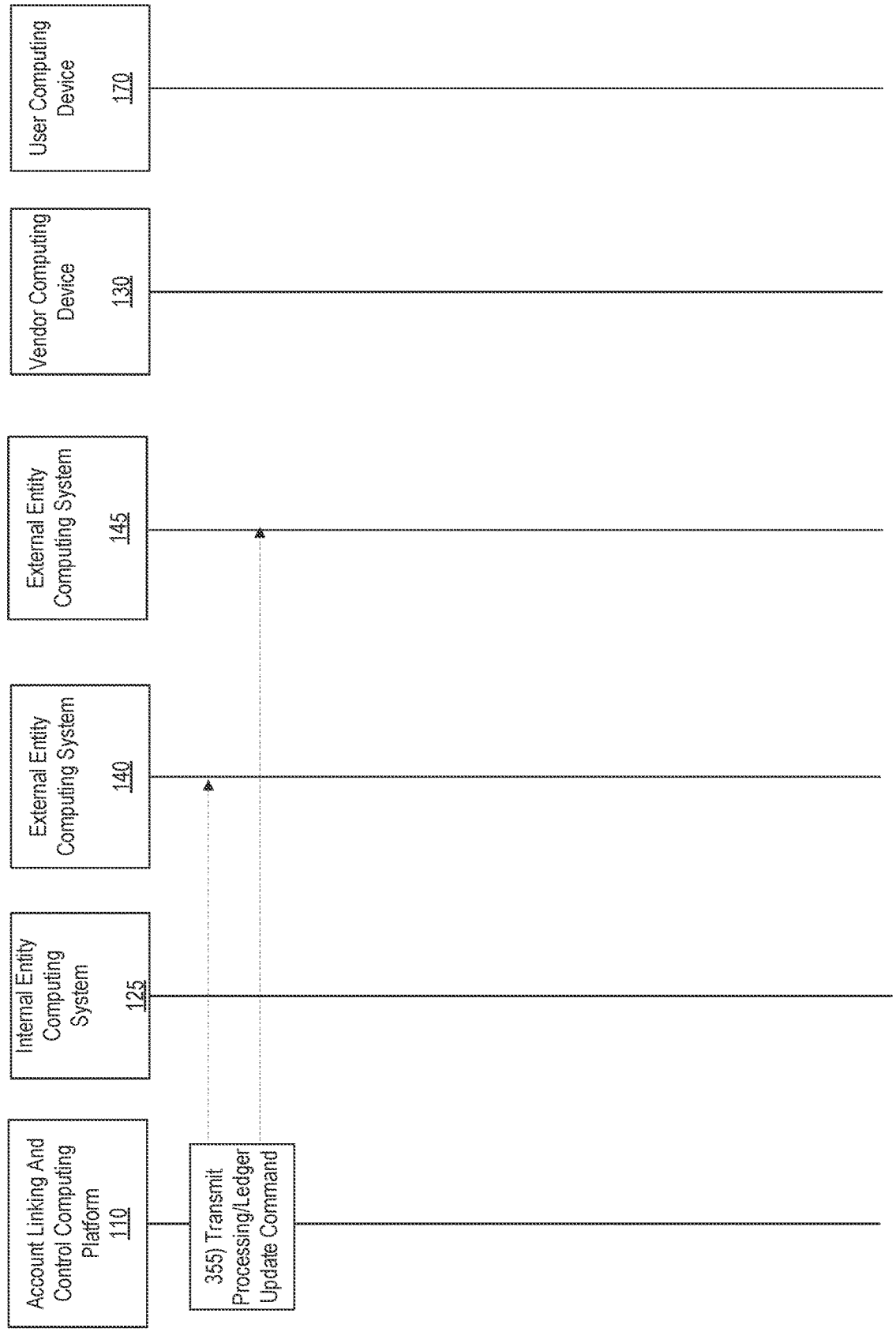

HOSTING ACCOUNT LINKING SERVICES TO ENABLE DYNAMIC AUTHENTICATION AND MULTI-COMPUTER EVENT PROCESSING

BACKGROUND

Aspects of the disclosure relate to electrical computers, systems, and devices for account linking and dynamic authentication, device selection and event processing.

Users often have a plurality of accounts, payment devices, and the like, associated with multiple different financial institutions or entities that they frequently use to conduct transactions at self-service kiosks, make purchases, and the like. However, it can be cumbersome to carry all devices or devices associated with multiple accounts on a regular basis. Accordingly, arrangements described herein provide for dynamic authentication of a user and access to any registered account to conduct transactions at a vendor computing device, even if a physical device or card associated with the account is not present.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with processing transactions using linked devices even if the device is not present.

In some aspects, registration data may be received. For instance, data associated with a user and one or more user accounts and/or payment devices may be received. In some examples, each account or device may be associated with a different entity and, in some examples, each entity may be different from the enterprise organization implementing the arrangements described here.

In some examples, a request to process or initiate a transaction may be received. In some examples, the request may be received via vendor computing device, such as a point-of-sale system. The request may be initiated via a first device, such as a debit card, credit card, or the like. If the user is a registered user, the system may retrieve user data based on a user identifier extracted from the request for transaction processing.

Based on the retrieved user data, the system may request, from a plurality of external entity systems, user profile data associated with one or more payment devices or accounts associated with the user and provided via the registration data. In response to the request, one or more external entities of the plurality of external entities may provide user profile data. The user profile data may include raw customer data and encrypted authentication data. A hash of the encrypted authentication data may be generated and stored.

The system may dynamically generate a rendering displaying one or more payment devices or accounts available for selection (e.g., linked and available even if the payment device is not currently present). A user may select a first payment device. The system may cause initiation of a handshake between the vendor computing system and a user computing device of the user. If the handshake is successful, the user may provide requested authentication data. A hash of the authentication data may be generated and compared to the stored hash of the encrypted authentication data received from the external entity associated with the selected first payment device. If the hashes match, the transaction may be processed. If there is not a match, the transaction may be denied.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for implementing account linking and dynamic device selection functions in accordance with one or more aspects described herein;

FIGS. 3A-3K depict another illustrative event sequence for implementing account linking and dynamic device selection functions in accordance with one or more aspects described herein;

DETAILED DESCRIPTION

Figure 1A:
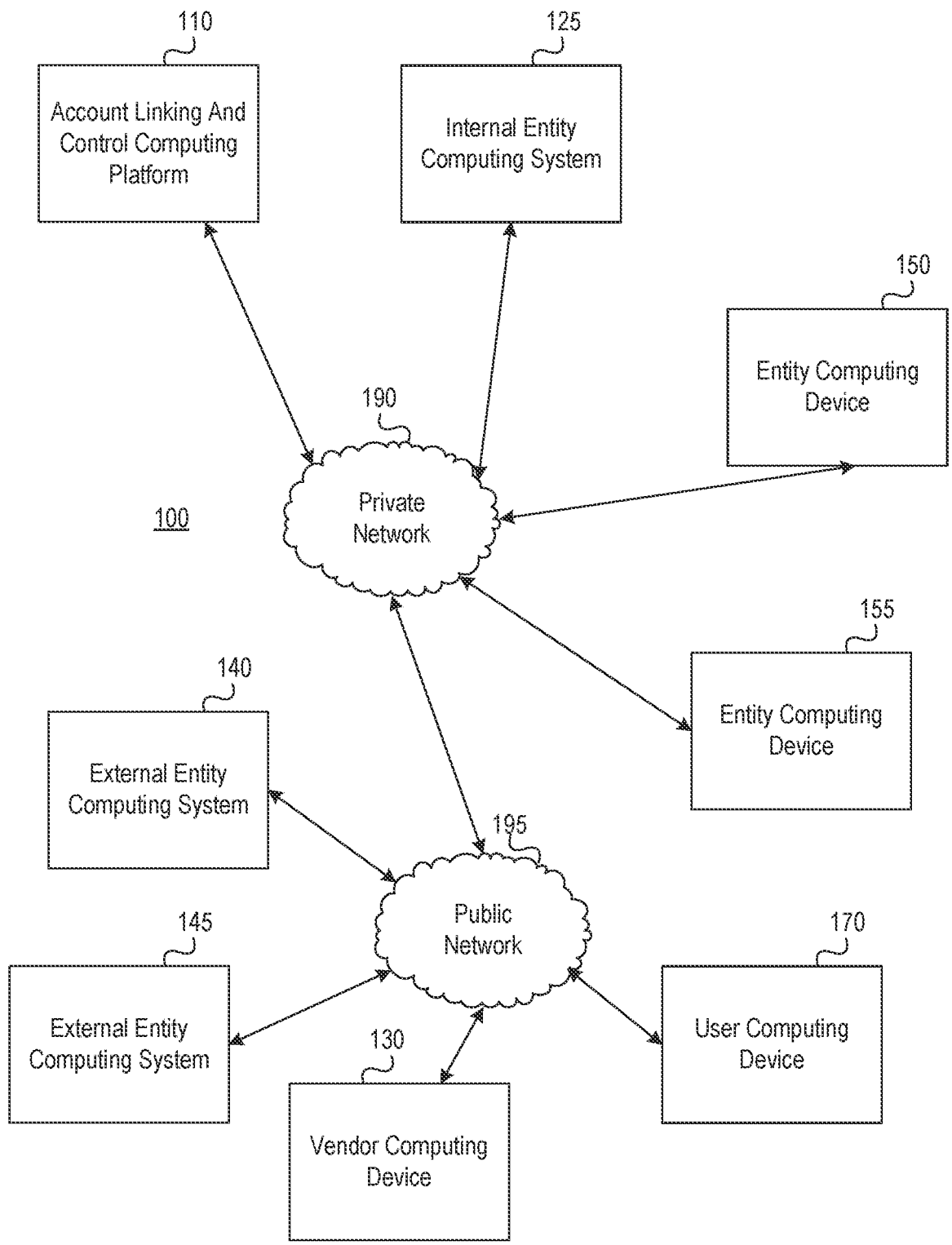
FIGS. 1A and 1B depict an illustrative computing environment for implementing account linking and dynamic device selection functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, users often have a plurality of payment devices (e.g., debit cards, credit cards, or the like) and/or accounts that they may use on a regular basis to conduct various transactions (e.g., conduct transactions at an automated teller machine (ATM), make purchases, or the like). However, carrying all of the devices or account information can be cumbersome. Accordingly, aspects described herein are directed to linking accounts to enable dynamic authentication of a user and subsequent use of a device or account, even if the device itself is not present.

For instance, a user may initiate a transaction at a self-service kiosk or point-of-sale system at a vendor. In some examples, transactions may include withdrawal of funds, deposit of funds, check cashing, balance inquiry, and the like via, for instance, an ATM. Additionally or alternatively, transactions may include purchases made via the point-of-sale system of the vendor.

The user may initiate the transaction by swiping, tapping or the like, a first payment device. In some examples, the user may be authenticated via that device. User data may then be retrieved. User data may include identification of a plurality of payment devices or accounts associated with the user and provided via a registration process.

Request for user profile data may be transmitted to one or more external entities associated with each payment device or account. The user profile data may be received form one or more of the entities and may include raw customer data as well as encrypted authentication data. A hash of the encrypted authentication data may be generated and stored.

The system may then dynamically generate a rendering displaying all available devices and/or accounts for selection (e.g., registered devices or accounts for which user profile data was received). The user may select a second payment device different from the first payment device and, for which the actual device is not present. The user may provide authentication data associated with the selected second device.

A hash of the user provided authentication may be generated and compared to the stored hash generated from the encrypted authentication data associated with the selected device. If the hashes match, the transaction may be processed. If not, the transaction may be denied.

These and various other arrangements will be discussed more fully below.

Figure 1B:
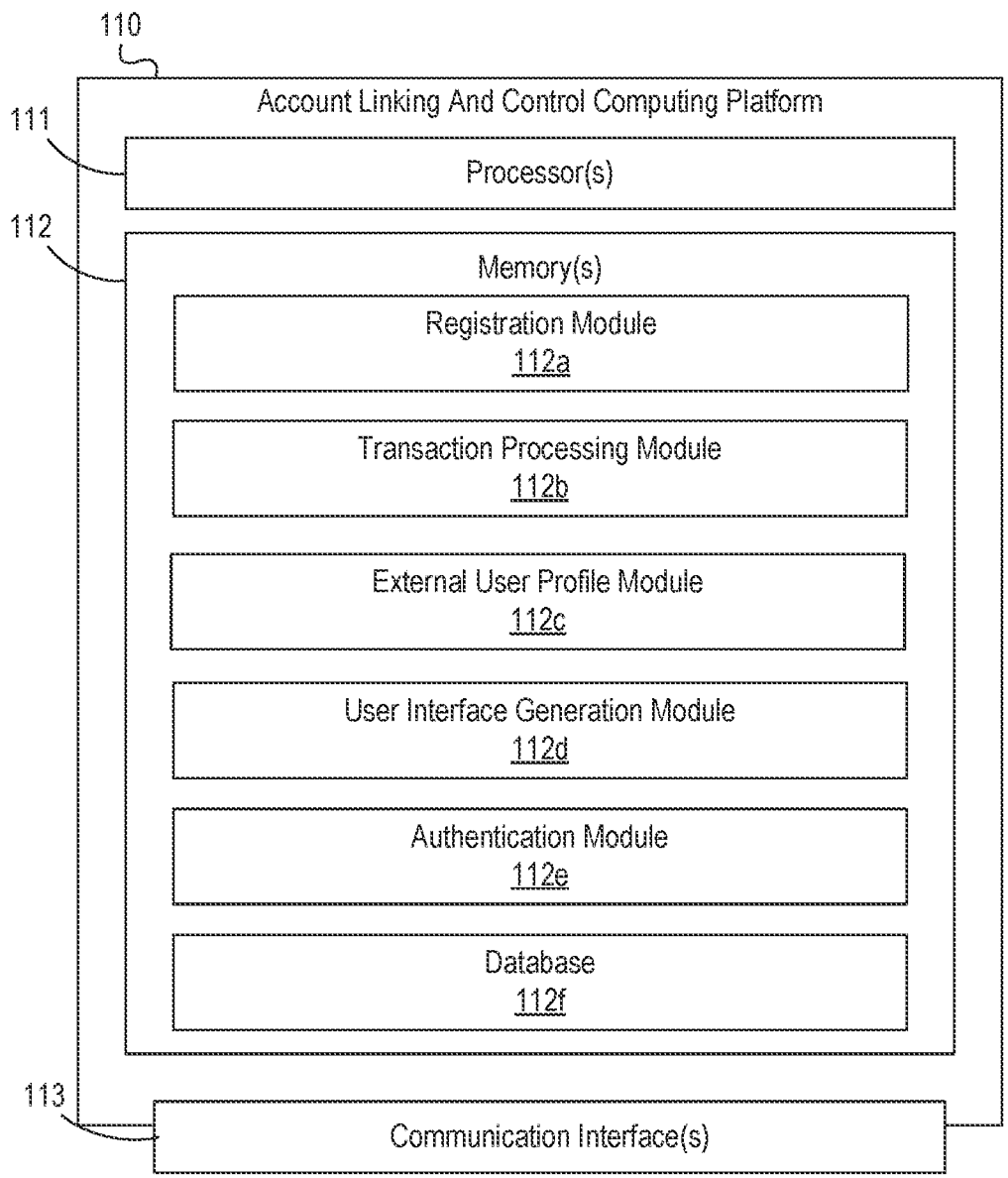

FIGS. 1A-1B depict an illustrative computing environment for implementing and using dynamic authentication, device selection and event processing functions in accordance with one or more aspects described herein. Referring to FIG. 1A, computing environment 100 may include one or more computing devices and/or other computing systems. For example, computing environment 100 may include account linking and control computing platform 110, internal entity computing system 125, entity user computing device 150, entity user computing device 155, vendor computing device 130, external entity computing system 140, external entity computing system 145 and user computing device 170. Although one internal entity computing system 125, two entity user computing devices 150, 155, two external entity computing systems 140, 145, one vendor computing device 130 and one user computing device 170 are shown, any number of systems or devices may be used without departing from the invention.

Account linking and control computing platform 110 may be configured to provide intelligent, dynamic, and efficient account linking, device selection and event processing functions. For instance, account linking and control computing platform 110 may receive registration data from one or more users. In some examples, the registration data may include identification of one or more accounts of a user, payment devices of a user (e.g., credit card, debit card, or the like), financial institutions associated with the accounts or payment devices, and the like.

After receiving registration data for a user, the account linking and control computing platform 110 may receive a request to process an event. In some examples, processing the event may include executing a transaction at a self-service kiosk, such as an automated teller machine (ATM), automated teller assistant (ATA), or the like. Additionally or alternatively, the request to process the event may include a request to make a purchase at a vendor, such a via a point-of-sale system at a vendor (e.g., vendor computing device 130).

In some examples, upon receiving the request to process the event, the user may be authenticated. For instance, authentication data associated with a device or account used to initiate the transaction may be requested and compared to pre-stored data to determine whether the user is authenticated.

Upon receiving the request to process the event (and, in some examples, authenticating the user) the account linking and control computing platform 110 may determine whether the user requesting the event is a registered user (e.g., has provided registration data including other payment device and accounts to be linked and accessible via the arrangements described herein). If not, the process may continue via conventional methods of processing. If the user is a registered user, customer profile data from a plurality of external entities, such as other financial institutions, may be requested. For instance, a secure API call may be transmitted to each external entity associated with the payment device, account, or the like, of the user. The call may include a request for customer or user profile data including account information, balance information, and the like. In some examples, the customer profile data may include user authentication data that may be encrypted to prevent private data from being identifiable and stored, without encryption, at the enterprise organization implementing the account linking and control computing platform 110.

Upon receiving the customer or user profile data, account linking and control computing platform 110 may further process the customer profile data by segregating the encrypted customer or user authentication profile or data, generating an encrypted authentication has and storing the encrypted authentication hash in an encrypted authentication database.

Account linking and control computing platform 110 may generate an instruction to dynamically render each available payment device or account on a display of a device from which the request to process the event was received. For instance, if the request to process the event was received via a self-service kiosk, such as entity computing device 150 or entity computing device 155, accounts available for selection may be rendered and displayed on a display of the self-service kiosk for selection by the user.

A user may provide input, e.g., via the self-service kiosk, including selection of an account or device. In some examples, the selected account or device may be different from an account or device used to initiate the request to process the event. For instance, if a user initiates a transaction at an ATM by inserting a first card into the machine, the user may select an account associated with a second, different card, for processing the transaction. Accordingly, the second card need not be physically present for the user to access or process transactions with the card.

In response to selecting an account or device, the user may be prompted to provide authentication data. The user authentication data may be authentication data associated with the selected account or device. Upon receiving the authentication data, the account linking and control computing platform 110 may convert the received authentication data to an encrypted authentication hash. This encrypted authentication hash may be compared to authentication hashes stored based on received authentication data from the external entities. If a match exists, the user may be authenticated and the transaction or event processed. If not, additional authentication data may be requested and/or the requested event might be denied.

In some examples in which a user is attempting a purchase at a vendor device, such as vendor computing device 130, a mobile device of a user, such as user computing device 170, may provide additional authentication. For instance, a handshake operation may be initiated between the vendor computing device 130 and the user computing device 170. This completed handshake may act as a form of authentication to enable the user to process the transaction.

Internal entity computing system 125 may be or include one or more computing devices or systems that may host or execute one or more applications or systems implemented by the enterprise organization implementing the account linking and control computing platform. For instance, internal entity computing system 125 may store user information, account information, host an online or mobile banking application, or the like. In some examples, internal entity computing system 125 may store authentication information for a user, account ledger data, and the like.

Entity computing device 150 and/or entity computing device 155 may be any computing device associated with the enterprise organization implementing the account linking and control computing platform 110. In some examples, entity computing device 150 and/or entity computing device 155 may be self-service kiosks, such as an ATM, ATA, or the like. Additionally or alternatively, one or more of entity computing device 150 and/or entity computing device 155 may be or include a computer terminal operated by an employee of the enterprise organization to control aspects of the account linking and control computing platform 110 and the like.

External entity computing system 140 and/or external entity computing system 145 may be or include one or more computing devices or systems associated with entities external to the enterprise organization implementing the account linking and control computing platform 110. For instance, external entity computing system 140 and external entity computing system 145 may be associated with one or more other external entities different from the enterprise organization that may be associated with one or more user accounts or payment devices (e.g., debit card, credit card, or the like) that the user is registering with the account linking and control computing platform 110. For instance, if the account linking and control computing platform 110 is implemented by an enterprise organization that is a first financial institution, external entity computing system 140 may be associated with a second financial institution different from the first financial institution and external entity computing system 145 may be associated with a third financial institution different from the first financial institution and second financial institution. Accordingly, data associated with users, user accounts, user devices, or the like, may be retrieved from these systems during the processes described herein.

Vendor computing device 130 may be a point-of-sale or other system associated with a merchant, vendor, or the like, at which a user is requesting a transaction (e.g., making a purchase). The vendor computing device 130 may include a terminal having a display that may, in some examples, receive user input.

User computing device 170 may be or include a mobile device of a user, wearable device, or the like. In some examples, user computing device 170 may be or include any Internet of Things (IoT) device, such as a smartphone, smart watch, augmented reality device (e.g., glasses), virtual reality device, laptop computer, tablet computer, or the like. User computing device 170 may be used as a point of authentication by completing a handshake protocol with the vendor computing device 130 in arrangements in which a user is making a purchase via the vendor computing device 130.

As mentioned above, computing environment 100 also may include one or more networks, which may interconnect one or more account linking and control computing platform 110, internal entity computing system 125, entity computing device 150, entity computing device 155, vendor computing device 130, external entity computing system 140, external entity computing system 145, and/or user computing device 170. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, account linking and control computing platform 110, internal entity computing system 125, entity computing device 150, entity computing device 155 may be associated with an enterprise organization (e.g., a financial institution), and private network 190 may be associated with and/or operated by the organization, and may include one or more networks (e.g., LANs, WANs, virtual private networks (VPNs), or the like) that interconnect account linking and control computing platform 110, internal entity computing system 125, entity computing device 150, entity computing device 155 and one or more other computing devices and/or computer systems that are used by, operated by, and/or otherwise associated with the organization. Public network 195 may connect private network 190 and/or one or more computing devices connected thereto (e.g., account linking and control computing platform 110, internal entity computing system 125, entity computing device 150, entity computing device 155) with one or more networks and/or computing devices that are not associated with the organization. For example, vendor computing device 130, external entity computing system 140, external entity computing system 145, and/or user computing device 170 might not be associated with an organization that operates private network 190 (e.g., because vendor computing device 130, external entity computing system 140, external entity computing system 145, and/or user computing device 170 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect vendor computing device 130, external entity computing system 140, external entity computing system 145, and/or user computing device 170 to private network 190 and/or one or more computing devices connected thereto (e.g., account linking and control computing platform 110, internal entity computing system 125, entity computing device 150, entity computing device 155).

Referring to FIG. 1B, account linking and control computing platform 110 may include one or more processors 111, memory 112, and communication interface 113. A data bus may interconnect processor(s) 111, memory 112, and communication interface 113. Communication interface 113 may be a network interface configured to support communication between account linking and control computing platform 110 and one or more networks (e.g., private network 190, public network 195, or the like). Memory 112 may include one or more program modules having instructions that when executed by processor(s) 111 cause account linking and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of account linking and control computing platform 110 and/or by different computing devices that may form and/or otherwise make up account linking and control computing platform 110.

For example, memory 112 may have, store and/or include registration module 112a. Registration module 112a may store instructions and/or data that may cause or enable the account linking and control computing platform 110 to receive registration data and/or a registration request from one or more users. For instance, a user may request to registered with the system (e.g., via user computing device 170). The request may include user identifying information, user computing device identifying information, as well as data related to one or more accounts, payment devices, and the like, associated with the user. The one or more accounts, payment devices and the like each may be associated with one or more entities, including the enterprise organization as well as external entities not associated with the enterprise organization.

Account linking and control computing platform 110 may further have, store and/or include transaction processing module 112b. Transaction processing module 112b may store instructions and/or data that may cause or enable the account linking and control computing platform 110 to receive a request to process a transaction (e.g., from a self-service kiosk such as an ATM (e.g., entity computing device 150 or the like), from a point-of-sale system of a vendor (e.g., vendor computing system 130, or the like), or the like). The request to process the transaction may be initiated by a user swiping, inserting, tapping, or the like, a payment device (such as a debit card, credit card, or the like) at a device (e.g., entity computing device 150, vendor computing device 130, or the like). Additionally or alternatively, the request to initiate the transaction may be performed using biometric data of a user (e.g., fingerprint, iris scan, voice print, or the like), using a mobile device of the user (e.g., user computing device 170), or the like.

The transaction processing module 112b may receive transaction processing requests and extract user identifying information. This information may be used to retrieve user data (e.g., account data, device data, or the like) associated with the user and stored by the account linking and control computing platform 110, by one or more internal entity computing systems 125, or the like. This data may be used to identify external entities from which customer profile data may be requested, to which account ledger update commands may be transmitted, and the like.

Account linking and control computing platform 110 may further have, store and/or include external user profile module 112c. External user profile module 112c may store instructions and/or data that may cause or enable the account linking and control computing platform 110 to initiate a secure application programming interface (API) call to one or more identified external entities (e.g., external entities associated with payment devices of the user identified via the registration process) to request customer/user profile data, as discussed more fully herein. For instance, entities identified via the transaction processing module 112b may be transmitted to the external user profile module 112c and requests for user/customer profile data may be generated and transmitted via the secure API call. In response, each external entity may transmit customer/user profile data including customer data, account data, and the like, as well as encrypted authentication data of the user. The data may be received by the external user profile module 11c and segregated.

The external user profile module 112c may generate a hash of the encrypted authentication data received from each external entity (e.g., #EncryptedAuthHashBank1, #EncryptedAuthHashBank2, or the like). The generated hashes may be stored (e.g., in a database 112f).

Account linking and control computing platform 110 may further have, store and/or include user interface generation module 112d. User interface generation module 112d may store instructions and/or data that may cause or enable the account linking and control computing platform 110 to generate and/or transmit one or more user interfaces. For instance, based on the received user/customer profile data from the one or more external entities, the user interface generation module 112d may dynamically render available payment devices on a user interface and may transmit and cause the user interface to be displayed on a display of the self-service kiosk (e.g., entity computing device 150, the vendor point-of-sale device (e.g., vendor computing device 130) or the like. The user interface may receive user input including selection of one device for processing the transaction and may process that selection. In some examples, user interface generation module 112d may further generate user interfaces indicating that a transaction has been denied, that a transaction has been processed, and the like.

Account linking and control computing platform 110 may further have, store and/or include authentication module 112e. Authentication module 112e may store instructions and/or data that may cause or enable the account linking and control computing platform 110 to generate a request for authentication data and transmit the request to a device, such as entity computing device 150, vendor computing device 130, and the like. The authentication data requested may be data associated with a payment device selected by the user from the dynamic rendering displayed on a display of the device. The user may input authentication response data which may be received by the authentication module 112e and processed. Processing the response data may include generating a hash of the authentication response data (e.g., #EncryptedAuthHashATM, #EncryptedAuthHashVendor, or the like) and may compare the generated hash to authentication data hashes generated from the user/customer profile data. If a match occurs, the transaction may proceed to processing. If a match does not occur, the transaction request may be denied.

FIGS. 2A-2I depict one example illustrative event sequence for implementing and using dynamic account linking, authentication, device selection and event processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2I may be performed in real-time or near real-time.

Figure 2A:
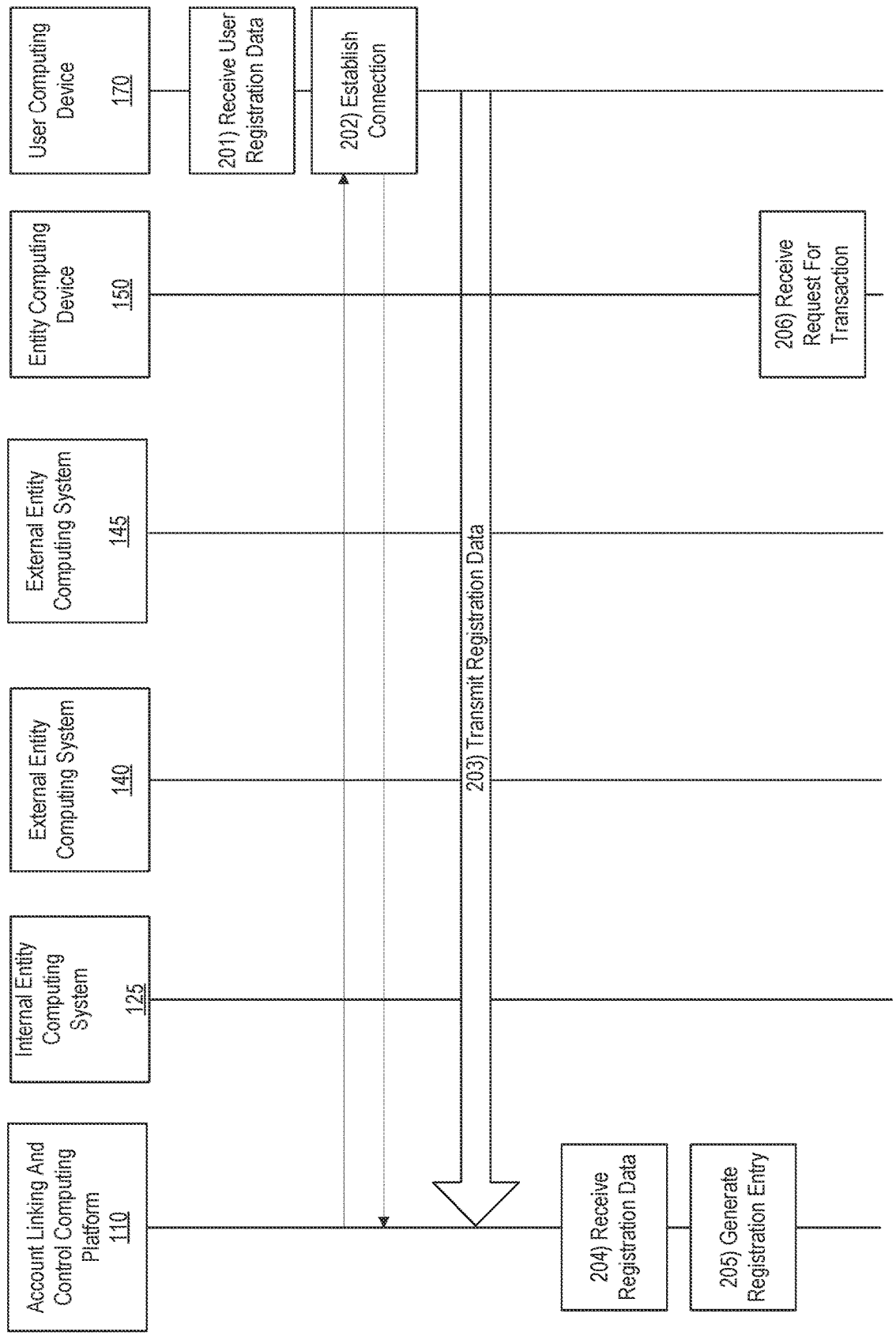

Referring to FIG. 2A, at step 201, a request for registration and user registration data may be received by a user computing device 170, such as a mobile device of the user, tablet computing device, or the like. The registration data may include user identifying information, account identifying information, mobile device identifying information, and the like. In addition, the registration data may include identification of one or more payment devices (e.g., debit cards, credit cards, or the like) that may be associated with different accounts of the user. In some examples, each payment device may be associated with a different external entity (e.g., different financial institution or service provider). In some examples, a payment device of the one or more payment devices may be associated with the enterprise organization implementing the account linking and control computing platform 110, while at least one other payment device may be associated with an external entity not associated with the enterprise organization. In some examples, a plurality of payment devices may be registered from various different entities, including the enterprise organization and other entities external to the enterprise organization.

At step 202, a connection may be established between the user computing device 170 and the account linking and control computing platform 110. For instance, a first wireless connection may be established between the account linking and control computing platform 110 and user computing device 170. Upon establishing the first wireless connection, a communication session may be initiated between account linking and control computing platform 110 and user computing device 170.

At step 203, the request for registration and registration data may be transmitted by the user computing device 170 to the account linking and control computing platform 110. For instance, the registration request and registration data may be transmitted during the communication session initiated upon establishing the first wireless connection.

At step 204, the registration data and request for registration may be received by the account linking and control computing platform 110. At step 205, a registration entry for the user may be generated and the user registration data may be stored in a database.

At step 206, entity computing device 150 may receive a request to process a transaction. For instance, a user may initiate a transaction at a self-service kiosk (e.g., entity computing device 150) by tapping, inserting or swiping a payment device (e.g., debit card, credit card, or the like), by providing biometric data (e.g., fingerprint, voice print, or the like), by detection of a user's mobile device (e.g., user computing device 170) via Bluetooth, near field communication, or the like, or the like. The request to process the transaction may include user identifying information, account identifying information, or the like, which may be used to retrieve additional data related to the user.

Figure 2B:
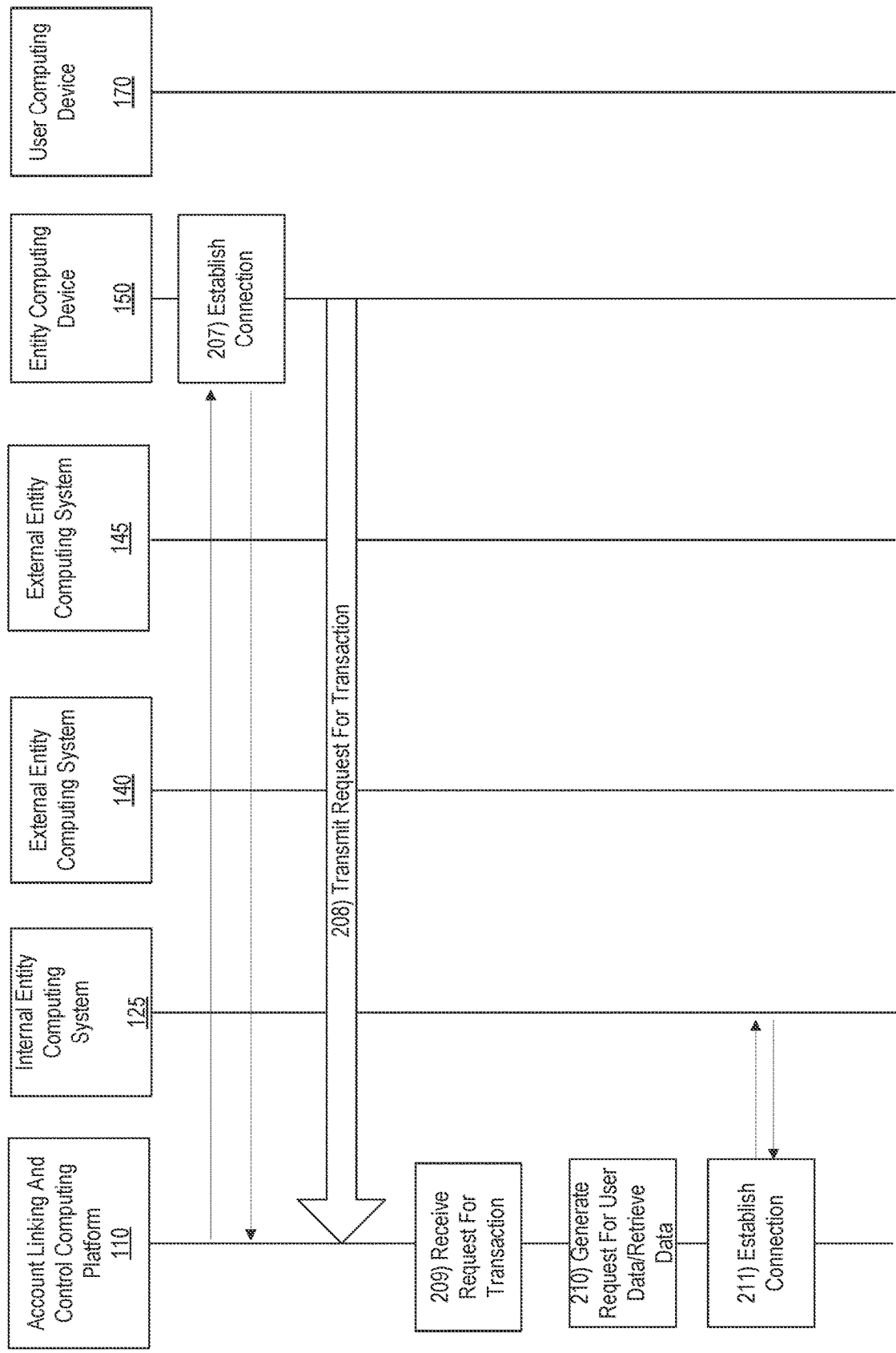

With reference to FIG. 2B, at step 207, a connection may be established between the entity computing device 150 and the account linking and control computing platform 110. For instance, a second wireless connection may be established between the account linking and control computing platform 110 and entity computing device 150. Upon establishing the second wireless connection, a communication session may be initiated between account linking and control computing platform 110 and entity computing device 150.

At step 208, the request for transaction processing may be transmitted by the entity computing device 150 to the account linking and control computing platform 110. For instance, the request for transaction processing may be transmitted during the communication session initiated upon establishing the second wireless connection.

At step 209, the request for transaction processing may be received by the account linking and control computing platform 110. The request may be processed and user and/or account identifying information (e.g., customer or user identifier) may be extracted. In some examples, a user may be authenticated upon initiating the transaction (e.g., authentication data associated with the device used to initiate the transaction may be received and compared to pre-stored data to authenticate the user).

At step 210, based on the extracted identifying information, a request for user data may be generated. In some examples, the request for user data may include a request for account or other data associated with the user and stored within one or more systems internal to the enterprise, such as internal entity computing system 125. In some examples, the request for user data may include retrieving data from one or more databases within account linking and control computing platform 110 that may store data associated with accounts, payment devices, and the like, associated with external entities and provided during registration.

At step 211, a connection may be established between the internal entity computing system 125 and the account linking and control computing platform 110. For instance, a third wireless connection may be established between the account linking and control computing platform 110 and internal entity computing system 125. Upon establishing the third wireless connection, a communication session may be initiated between account linking and control computing platform 110 and internal entity computing system 125.

Figure 2C:
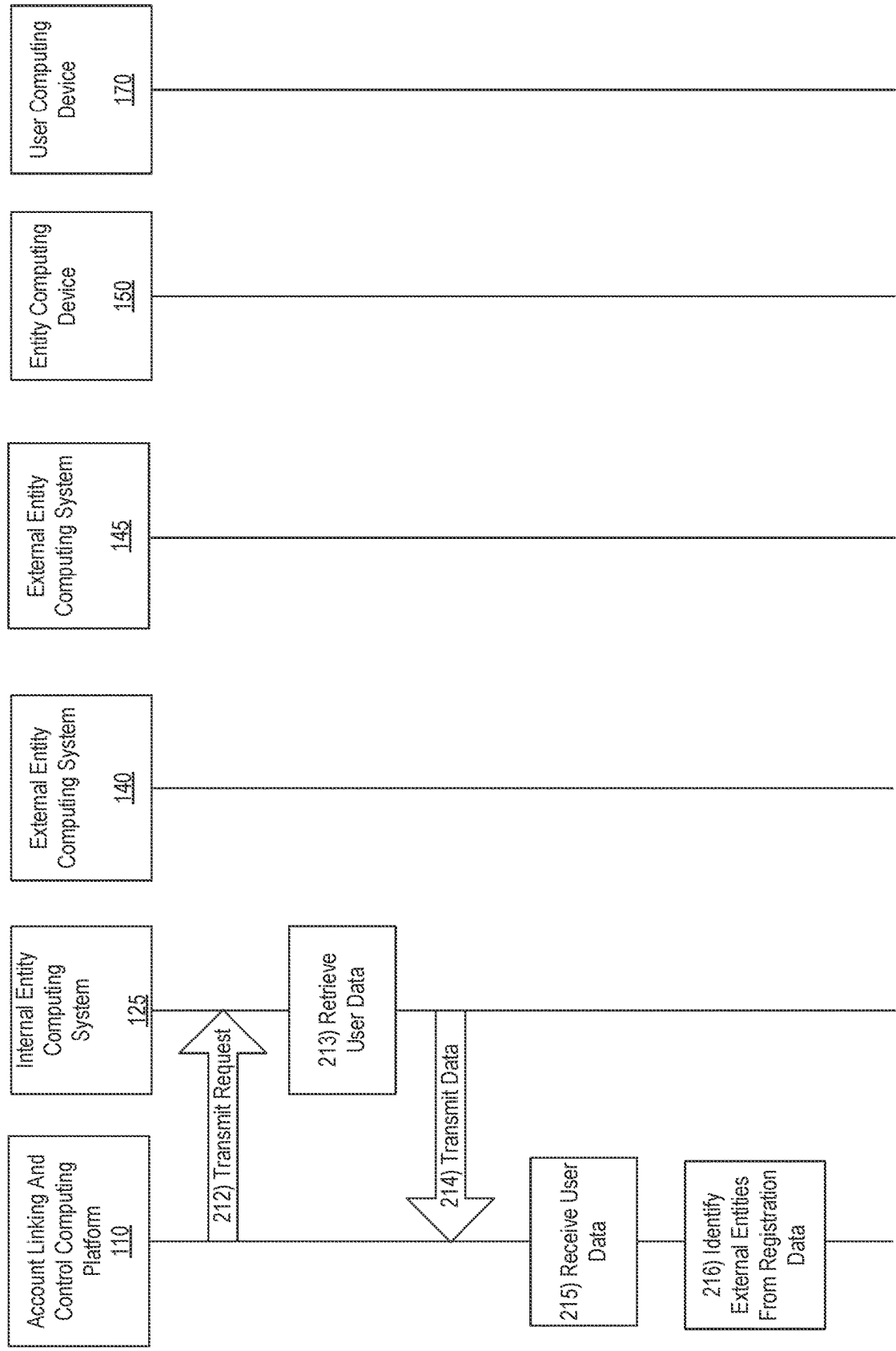

With reference to FIG. 2C, at step 212, the request for user data may be transmitted by the account linking and control computing platform to the internal entity computing system 125. For instance, the request for user data may be transmitted during the communication session initiated upon establishing the third wireless connection.

At step 213, the request for user data may be received and user data may be retrieved. At step 214, the retrieved user data may be transmitted by the internal entity computing system 125 to the account linking and control computing platform 110.

At step 215, the account linking and control computing platform 110 may receive the user data and retrieved registration data. At step 216, the data may be processed to identify one or more external entities associated with accounts, payment devices, or the like, of the user provided during registration.

Figure 2D:
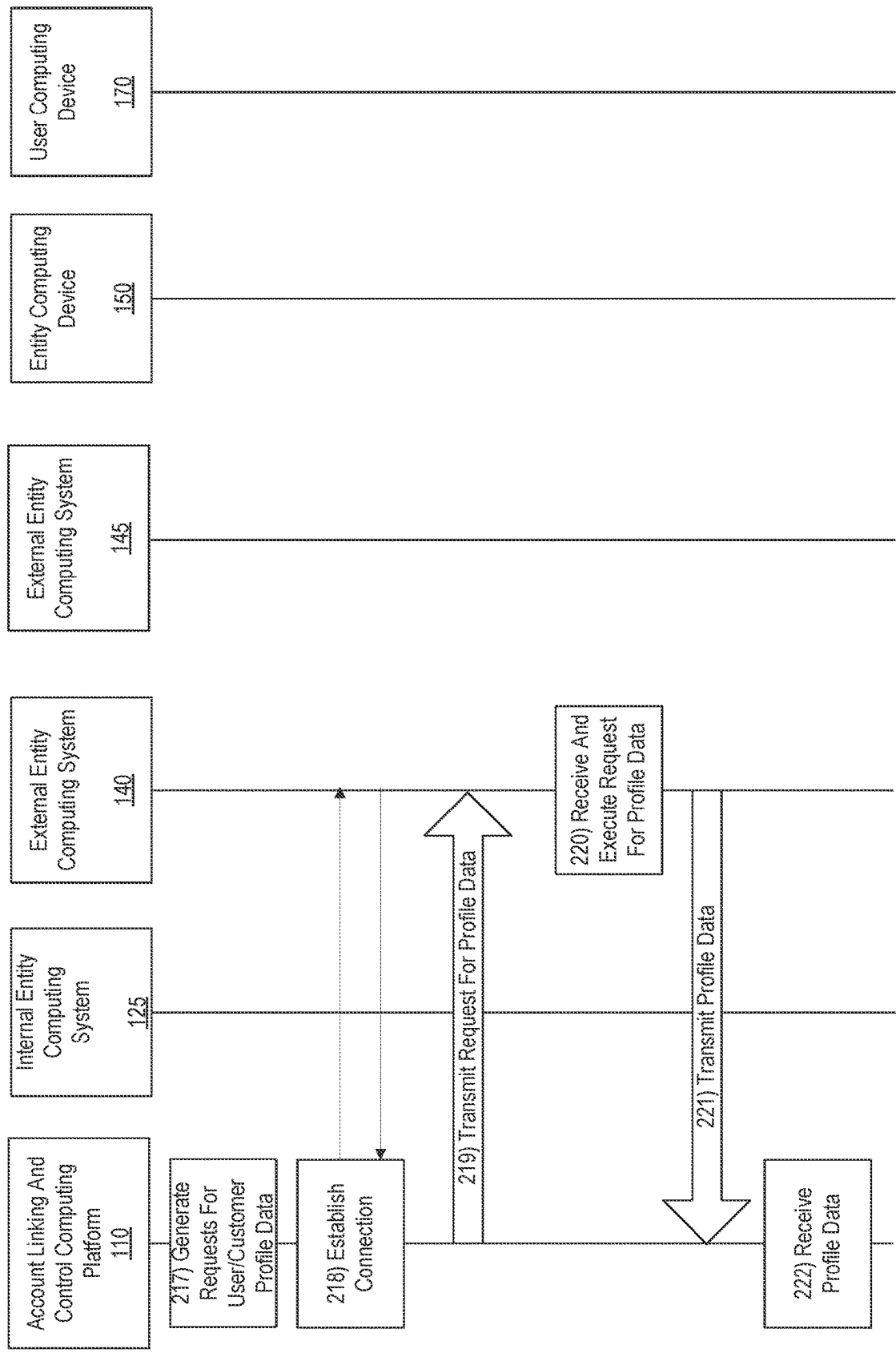

With reference to FIG. 2D, at step 217, one or more requests for user profile data may be generated by the account linking and control computing platform 110. For instance, a request for user/customer profile data may be generated for each external entity identified at step 216. The request for user/customer profile data may include a request for customer data including account data, identifying data, and the like, as well as encrypted authentication data.

At step 218, a connection may be established between the external entity computing system 140 and the account linking and control computing platform 110. For instance, a fourth wireless connection may be established between the account linking and control computing platform 110 and external entity computing system 140. Upon establishing the fourth wireless connection, a communication session may be initiated between account linking and control computing platform 110 and external entity computing system 140.

At step 219, the request for user/customer profile data may be transmitted by the account linking and control computing platform 110 to the external entity computing system 140. For instance, the request for user profile data may be transmitted during the communication session initiated upon establishing the fourth wireless connection. In some examples, external entity computing system 140 may be associated with a first external entity different from the enterprise organization (e.g., first financial institution different from the enterprise organization).

At step 220, external entity computing system 140 may receive the request for user profile data and may execute the request to retrieve the requested data. At step 221, first profile data may be transmitted by the external entity computing system 140 to the account linking and control computing platform 110.

At step 222, the account linking and control computing platform 110 may receive the first profile data (which may, e.g., be associated with a first payment device of the user provided during the registration process).

With reference to FIG. 2E, at step 223, the first user profile data may be processed. In some examples, process the first user profile data may include segregating the raw customer data (e.g., account data, identifying data, and the like) from encrypted authentication data. The encrypted authentication data may then be further processed and a hash may be generated (e.g., #EncryptedAuthHashBank1) for the encrypted authentication data associated with the first user profile data received from the first external entity. The hash may be stored in a database for later user in authenticating the user at step 224.

At step 225, a connection may be established between the external entity computing system 145 and the account linking and control computing platform 110. For instance, a fifth wireless connection may be established between the account linking and control computing platform 110 and external entity computing system 145. Upon establishing the fifth wireless connection, a communication session may be initiated between account linking and control computing platform 110 and external entity computing system 145.

At step 226, the request for user/customer profile data may be transmitted by the account linking and control computing platform 110 to the external entity computing system 145. For instance, the request for user profile data may be transmitted during the communication session initiated upon establishing the fifth wireless connection. In some examples, external entity computing system 145 may be associated with a second external entity different from the enterprise organization and different from the first external entity (e.g., second financial institution different from the enterprise organization and firth financial institution).

At step 227 external entity computing system 145 may receive the request for user profile data and may execute the request to retrieve the requested data.

Figure 2F:
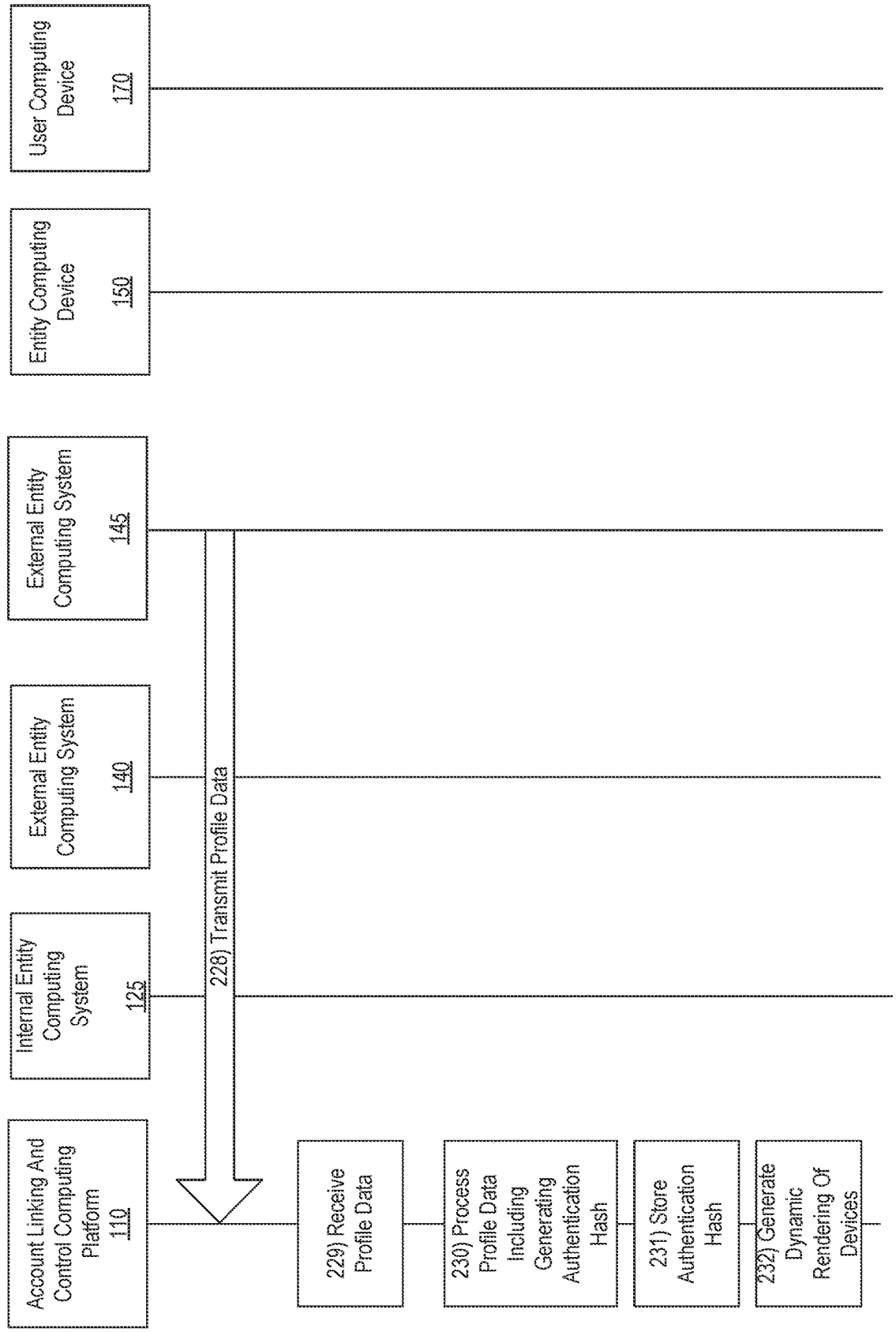

With reference to FIG. 2F, at step 228, second profile data may be transmitted by the external entity computing system 145 to the account linking and control computing platform 110.

At step 229, the account linking and control computing platform 110 may receive the second profile data (which may, e.g., be associated with a second payment device of the user provided during the registration process and different from the first payment device).

At step 230, the second user profile data may be processed. In some examples, process the second user profile data may include segregating the raw customer data (e.g., account data, identifying data, and the like) from encrypted authentication data. The encrypted authentication data may then be further processed and a hash may be generated (e.g., #EncryptedAuthHashBank2) for the encrypted authentication data associated with the second user profile data received from the second external entity. The hash may be stored in a database for later user in authenticating the user at step 231.

Although the arrangements shown illustrate a call being made to each external entity to obtain user profile data upon initiating a request for a transaction, in some examples, the call may be made and user profile data received, segregated, hashed and the hashes stored in a secure database or cache.

In some examples, the user profile data and generated hashes may be stored for a predetermined time period (e.g., one day, one week or the like) or may be stored for a predetermined number of transactions (e.g., deleted after one transaction (e.g., this requested transaction) is completed, deleted after 3 transactions are completed, or the like). Accordingly, the user data received from external entities might not be stored in perpetuity but instead may be automatically deleted upon detection of a triggering event (e.g., predetermined number of transactions completed, time period elapsed, or the like).

At step 232, a dynamic rendering of devices associated with the user and for which user profile data has been received may be generated. For instance, account linking and control computing platform 110 may dynamically render images of a plurality of payment devices or images representing payment devices associated with the user and for which user profile data has been received and/or used to initiate the transaction. Accordingly, in some examples, if a request for user profile data is transmitted but no response is received, that payment device might not be displayed on the user interface, even if the user has identified that device as associated with the user during the registration process. Accordingly, in some examples, the user interface may be dynamically generated to reflect only those devices associated with entities from which user profile data was received.

Figure 6:
FIG. 6 illustrates one example dynamic rendering generated according to one or more aspects described herein.

FIG. 6 illustrates one example dynamic rendering 600 including four payment devices/accounts available for selection 602a, 602b, 602c, 602d. In some examples, the rendering may include all devices or accounts associated with the user or fewer than all (e.g., a subset). The devices shown 602a, 602b, 602c, and 602d each include a logo representing a respective external entity associated with the device. However, other identifying information may be used without departing from the invention. Further, in some examples, one or more payment devices or accounts may be associated with the enterprise organization and may include the logo or other identifier associated with the enterprise organization rather than an external entity. In those arrangements, user data may be retrieved from a data store (e.g., internal entity computing system 125). In some examples, one device of the displayed devices may be the device used to initiate the transaction.

Figure 2G:
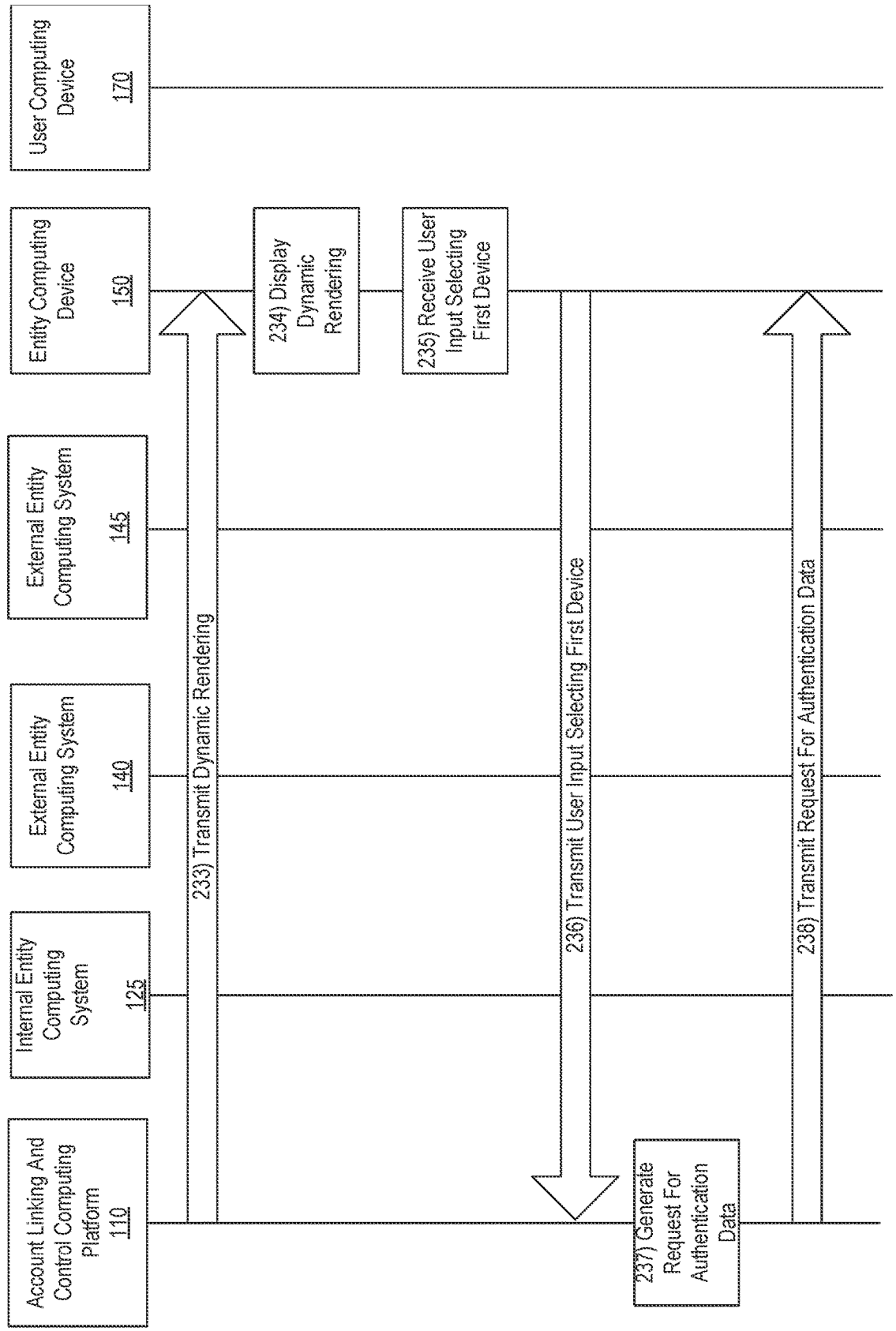

With reference to FIG. 2G, at step 233, the account linking and control computing platform 110 may transmit the dynamic rendering to the entity computing device 150. At step 234, the dynamic rendering may be displayed by a display of the entity computing device 150.

At step 235, user input selecting one device of the devices displayed on the dynamic rendering may be received. For instance, a user may provide (e.g., via a touch screen, key pad or other input device) input selecting one payment device of the plurality of payment devices displayed via the dynamic rendering. In some examples, the device selected from the rendering for processing the transaction may be different from a device used to initiate processing of the transaction or request processing of the transaction.

At step 236, the received user input or selection may be transmitted by the entity computing device 150 to the account linking and control computing platform 110.

In response to receiving the selection of a payment device from the plurality of payment devices displayed, a request for authentication data may be generated at step 237. For instance, the selected device may be mapped to registration data provided and customer or user profile data received from an external entity associated with the selected payment device. Accordingly, a request for authentication data (e.g., associated with the selected device) may be generated.

At step 238, the generated request for authentication data may be transmitted by the account linking and control computing platform 110 to the entity computing device 150.

Figure 2H:
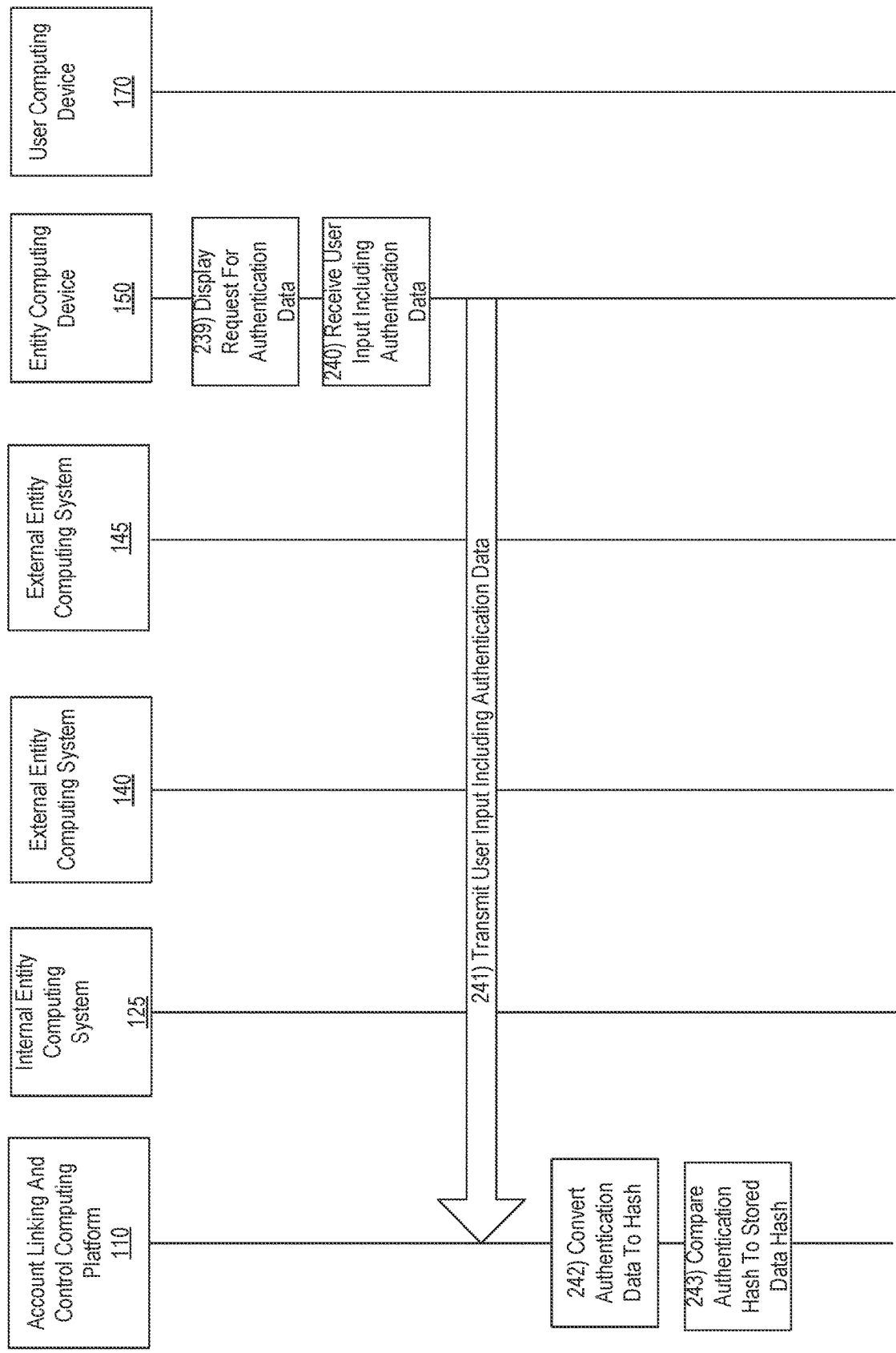

With reference to FIG. 2H, at step 239, the generated request for authentication data may be displayed by a display of the entity computing device 150. For instance, a user may be requested to input a password, personal identification number (PIN), biometric data, or the like associated with authentication of the selected device. In some examples, the request for authentication data may include identification of the requested device (e.g., an image of the device, a name of the external entity associated with the device, a "nickname" given the device by the user, or the like).

At step 240, user input including the requested authentication data may be received by the entity computing device 150. For instance, a user may provide authentication data via a touchscreen, key pad, sensor area on or associated with the device, and the like.

At step 241, the received user input including the authentication data may be transmitted by the entity computing device 150 to the account linking and control computing platform 110.

At step 242, the authentication data received from the user may be processed. In some examples, processing the received authentication data may include generating an encrypted hash of the authentication data (e.g., #EncryptedAuthHashATM).

At step 243, the encrypted hash of the authentication data received from the user (e.g., #EncryptedAuthHashATM) may be compared to encrypted hashes stored in a database and generated from user profile data received from one or more external entities (e.g., #EncryptedAuthHashBank1 or the like). In some examples, the hash of the authentication data received from the user may be compared to the hash of the encrypted authentication data received from the external entity associated with the selected device.

Figure 2I:
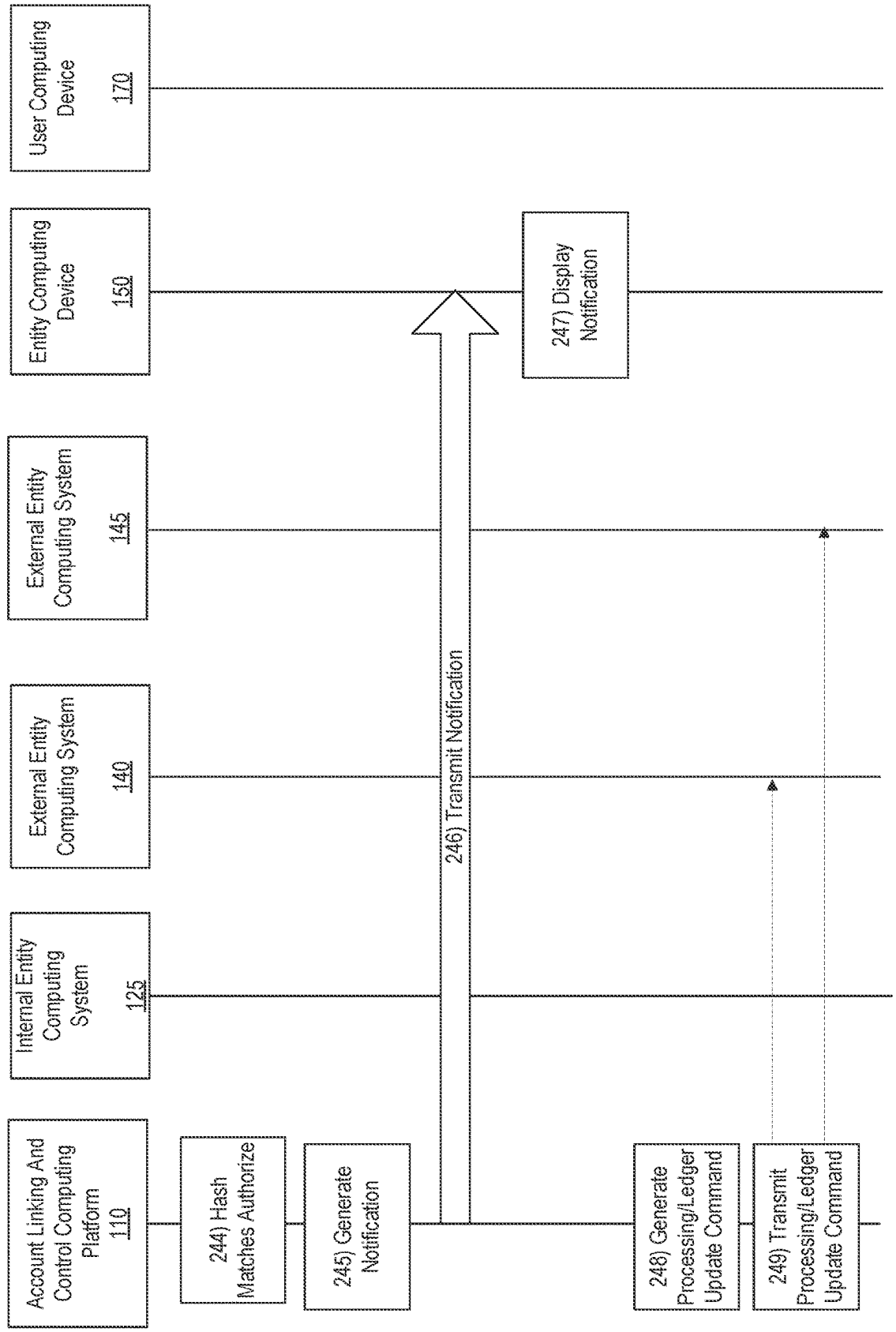

With reference to FIG. 2I, at step 244, if the hash generated from the authentication data received from the user matches the stored hash data generated from the user profile data, the requested transaction may be authorized. For instance, the user may be authorized to conduct one or more transactions via the ATM (e.g., entity computing device 150) even if the card or device associated with the account with which the user is transacting is not present, has not been used to initiate the transaction, or the like.

At step 245, a notification indicating authentication of the user may be generated by the account linking and control computing platform 110.

At step 246, the generated notification may be transmitted to the entity computing device 150. At step 247, the notification may be displayed by a display of the entity computing device 150.

At step 248, account linking and control computing platform may generate processing and/or ledger update commands. For instance, the user may process the desired transactions via the entity computing device 150 and data associated with the transaction(s) (e.g., amount, type of transaction and the like) may be transmitted to the account linking and control computing platform 110 for processing, transmission to one or more external systems, or the like. Based on the received transaction data, one or more processing and/or ledger update commands may be generated.

At step 249, the processing and/or ledger update commands may be transmitted to one or more external entity computing systems 140, 145. For instance, the generated commands may be transmitted to the external entity computing system associated with the selected payment device used for the transactions. The commands may be received by the entity system and executed.

In some examples, transmitting the processing or ledger update command may cause deletion of user profile data, user authentication hash data, and the like.

FIGS. 3A-3K depict another example illustrative event sequence for implementing and using dynamic account linking, authentication, device selection and event processing functions in accordance with one or more aspects described herein. The events shown in the illustrative event sequence are merely one example sequence and additional events may be added, or events may be omitted, without departing from the invention. Further, one or more processes discussed with respect to FIGS. 3A-3K may be performed in real-time or near real-time.

Figure 3A:
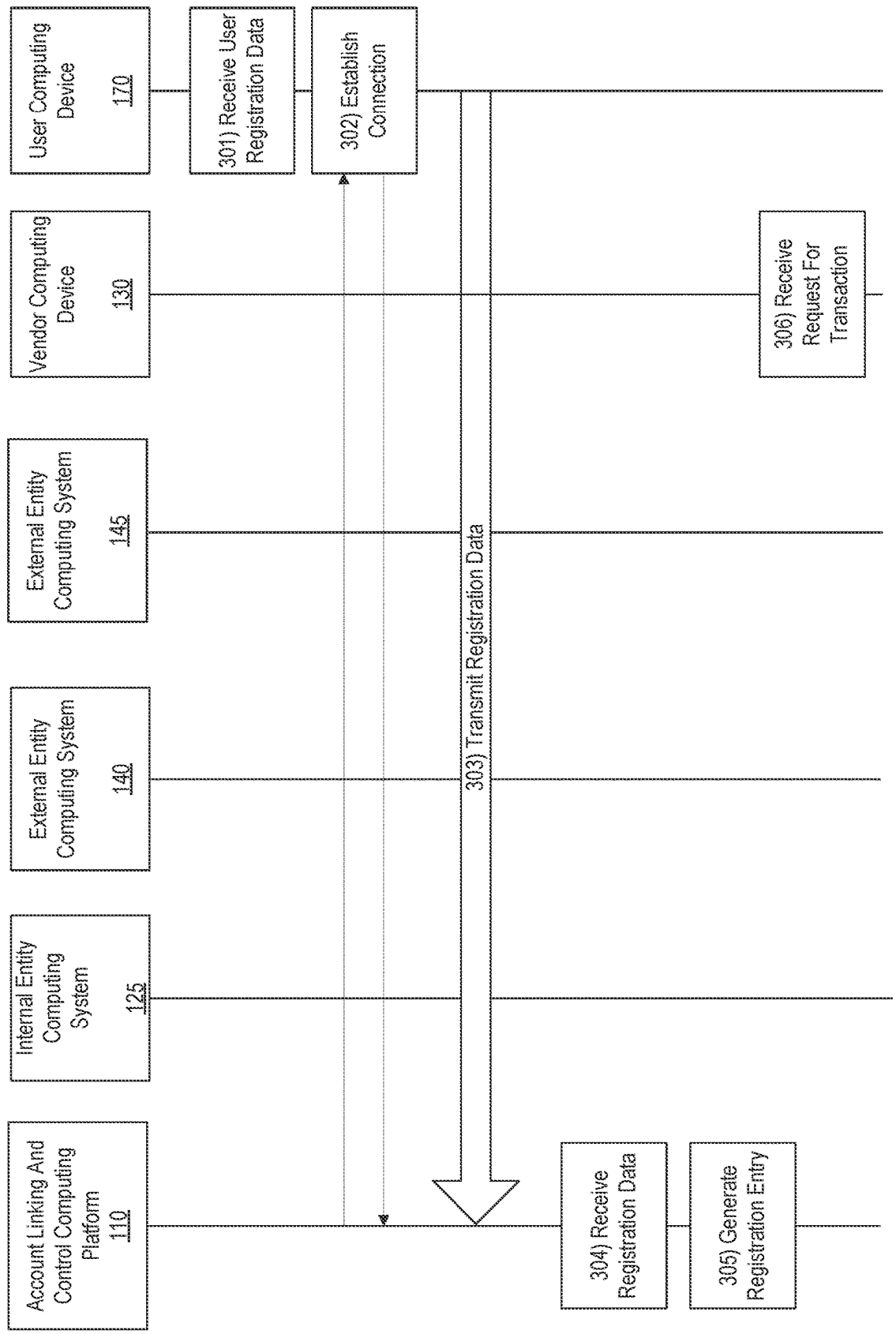

Referring to FIG. 3A, at step 301, a request for registration and user registration data may be received by a user computing device 170, such as a mobile device of the user, tablet computing device, or the like. The registration data may include user identifying information, account identifying information, mobile device identifying information, and the like. In addition, the registration data may include identification of one or more payment devices (e.g., debit cards, credit cards, or the like) that may be associated with different accounts of the user. In some examples, each payment device may be associated with a different external entity (e.g., different financial institution or service provider). In some examples, a payment device of the one or more payment devices may be associated with the enterprise organization implementing the account linking and control computing platform 110, while at least one other payment device may be associated with an external entity not associated with the enterprise organization. In some examples, a plurality of payment devices may be registered from various different entities, including the enterprise organization and other entities external to the enterprise organization.

At step 302, a connection may be established between the user computing device 170 and the account linking and control computing platform 110. For instance, a first wireless connection may be established between the account linking and control computing platform 110 and user computing device 170. Upon establishing the first wireless connection, a communication session may be initiated between account linking and control computing platform 110 and user computing device 170.

At step 303, the request for registration and registration data may be transmitted by the user computing device 170 to the account linking and control computing platform 110. For instance, the registration request and registration data may be transmitted during the communication session initiated upon establishing the first wireless connection.

At step 304, the registration data and request for registration may be received by the account linking and control computing platform 110. At step 305, a registration entry for the user may be generated and the user registration data may be stored in a database.

At step 306, entity computing device 150 may receive a request to process a transaction. For instance, a user may initiate a transaction at a vendor point-of-sale system (e.g., vendor computing device 130) by tapping, inserting or swiping a payment device (e.g., debit card, credit card, or the like), by providing biometric data (e.g., fingerprint, voice print, or the like), by detection of a user's mobile device (e.g., user computing device 170) via Bluetooth, near field communication, or the like, or the like. The request to process the transaction may include user identifying information, account identifying information, or the like, which may be used to retrieve additional data related to the user.

Figure 3B:
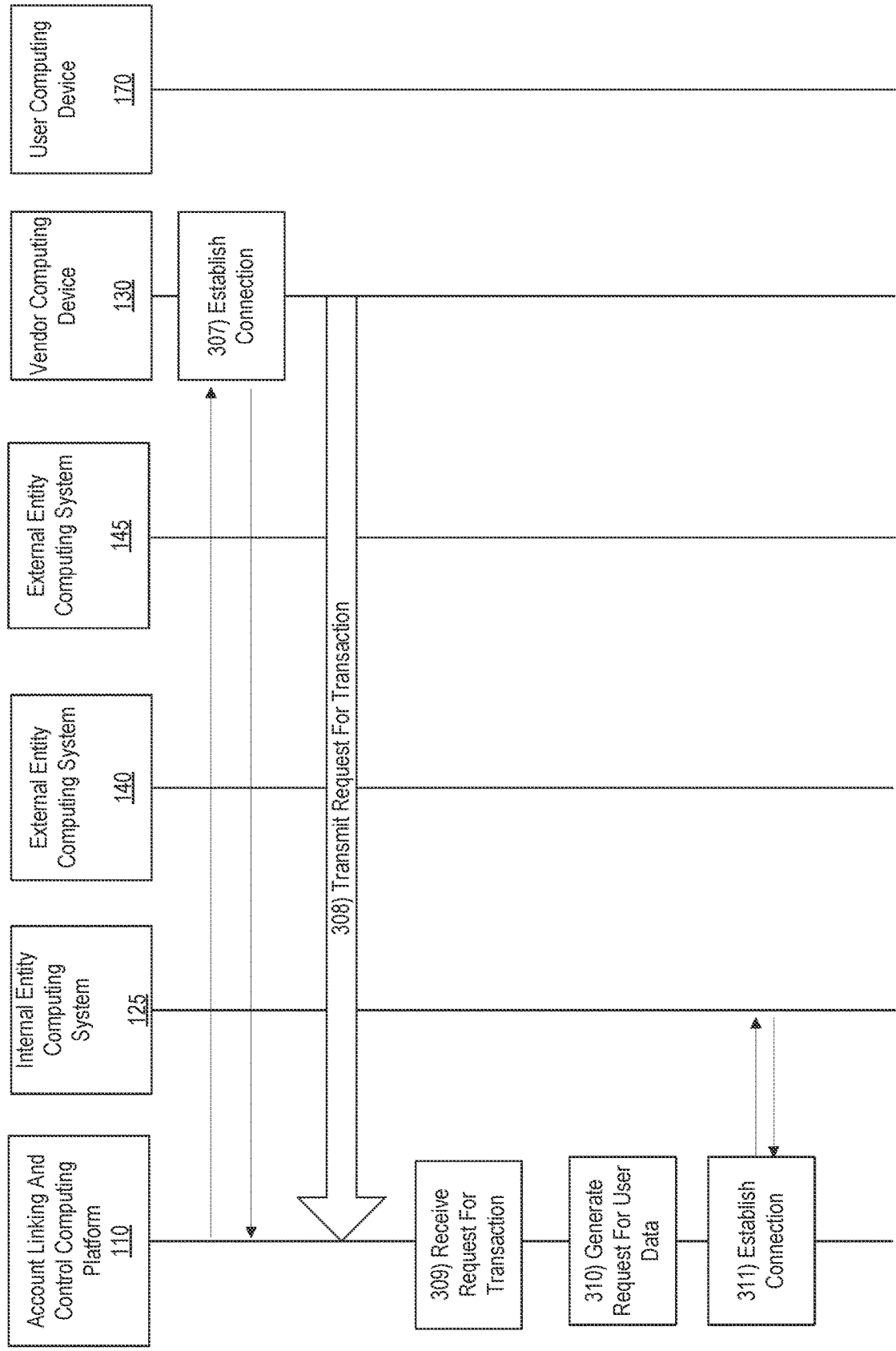

With reference to FIG. 3B, at step 307, a connection may be established between the vendor computing device 130 and the account linking and control computing platform 110. For instance, a second wireless connection may be established between the account linking and control computing platform 110 and vendor computing device 130. Upon establishing the second wireless connection, a communication session may be initiated between account linking and control computing platform 110 and vendor computing device 130.

At step 308, the request for transaction processing may be transmitted by the vendor computing device 130 to the account linking and control computing platform 110. For instance, the request for transaction processing may be transmitted during the communication session initiated upon establishing the second wireless connection.

At step 309, the request for transaction processing may be received by the account linking and control computing platform 110. The request may be processed and user and/or account identifying information (e.g., customer or user identifier) may be extracted.

At step 310, based on the extracted identifying information, a request for user data may be generated. In some examples, the request for user data may include a request for account or other data associated with the user and stored within one or more systems internal to the enterprise, such as internal entity computing system 125. In some examples, the request for user data may include retrieving data from one or more databases within account linking and control computing platform 110 that may store data associated with accounts, payment devices, and the like, associated with external entities and provided during registration.

At step 311, a connection may be established between the internal entity computing system 125 and the account linking and control computing platform 110. For instance, a third wireless connection may be established between the account linking and control computing platform 110 and internal entity computing system 125. Upon establishing the third wireless connection, a communication session may be initiated between account linking and control computing platform 110 and internal entity computing system 125.

Figure 3C:
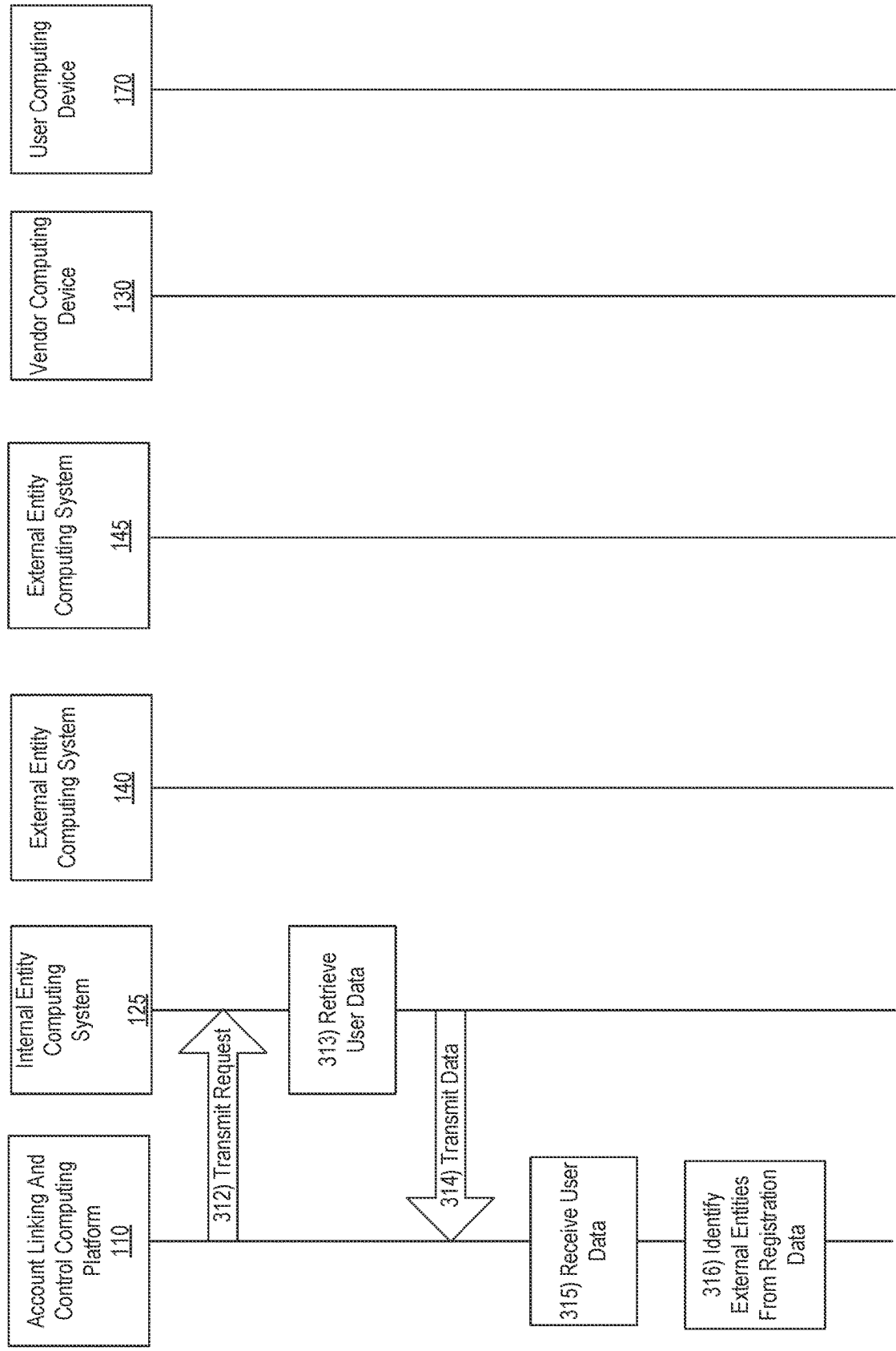

With reference to FIG. 3C, at step 312, the request for user data may be transmitted by the account linking and control computing platform to the internal entity computing system 125. For instance, the request for user data may be transmitted during the communication session initiated upon establishing the third wireless connection.

At step 313, the request for user data may be received and user data may be retrieved. At step 414, the retrieved user data may be transmitted by the internal entity computing system 125 to the account linking and control computing platform 110.

At step 315, the account linking and control computing platform 110 may receive the user data and retrieved registration data. At step 316, the data may be processed to identify one or more external entities associated with accounts, payment devices, or the like, of the user provided during registration.

Figure 3D:
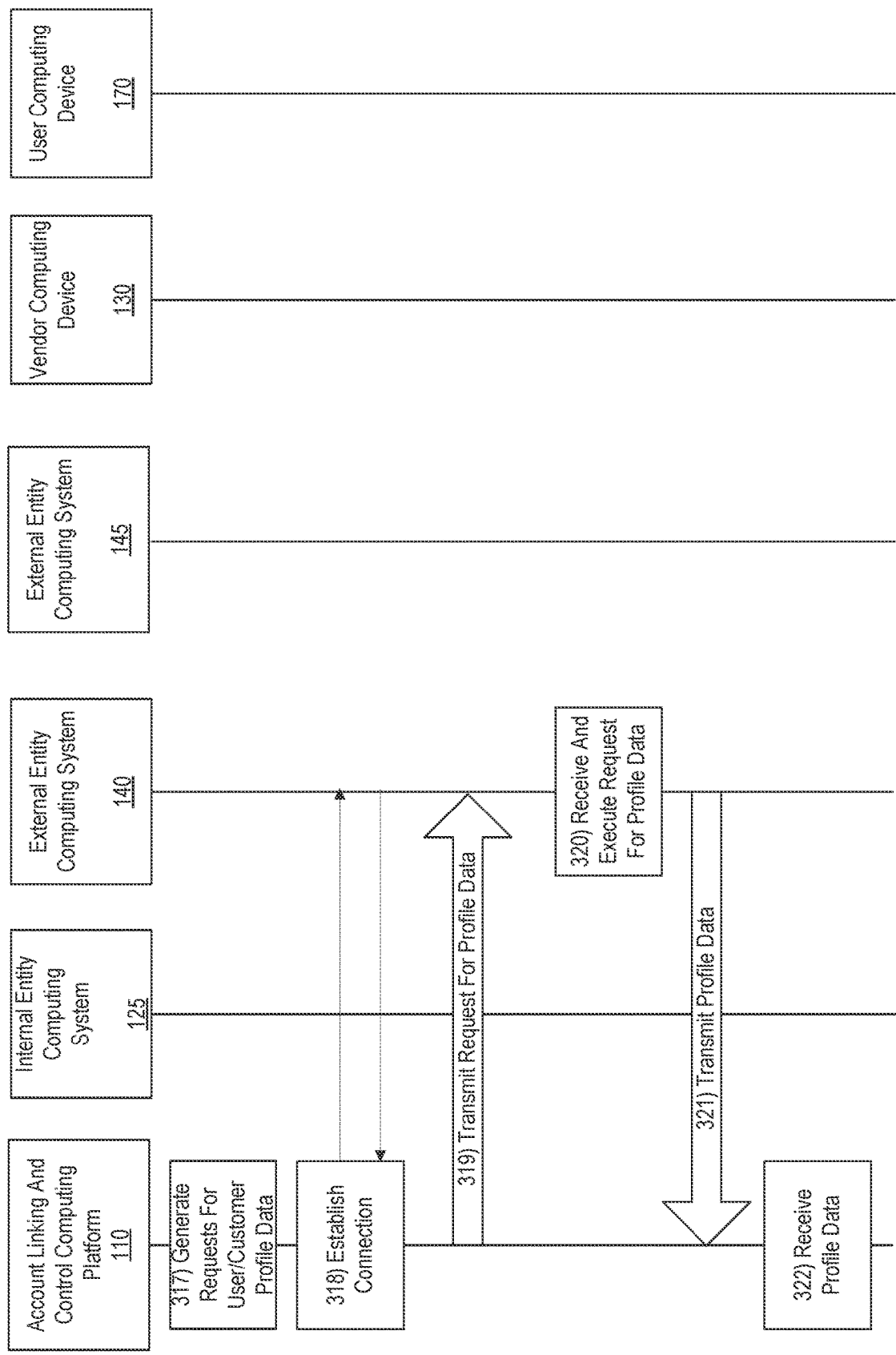

With reference to FIG. 3D, at step 317, one or more requests for user profile data may be generated by the account linking and control computing platform 110. For instance, a request for user/customer profile data may be generated for each external entity identified at step 316. The request for user/customer profile data may include a request for customer data including account data, identifying data, and the like, as well as encrypted authentication data.

At step 318, a connection may be established between the external entity computing system 140 and the account linking and control computing platform 110. For instance, a fourth wireless connection may be established between the account linking and control computing platform 110 and external entity computing system 140. Upon establishing the fourth wireless connection, a communication session may be initiated between account linking and control computing platform 110 and external entity computing system 140.

At step 319, the request for user/customer profile data may be transmitted by the account linking and control computing platform 110 to the external entity computing system 140. For instance, the request for user profile data may be transmitted during the communication session initiated upon establishing the fourth wireless connection. In some examples, external entity computing system 140 may be associated with a first external entity different from the enterprise organization (e.g., first financial institution different from the enterprise organization).

At step 320, external entity computing system 140 may receive the request for user profile data and may execute the request to retrieve the requested data. At step 321, first profile data may be transmitted by the external entity computing system 140 to the account linking and control computing platform 110.

At step 322, the account linking and control computing platform 110 may receive the first profile data (which may, e.g., be associated with a first payment device of the user provided during the registration process).

With reference to FIG. 3E, at step 323, the first user profile data may be processed. In some examples, process the first user profile data may include segregating the raw customer data (e.g., account data, identifying data, and the like) from encrypted authentication data. The encrypted authentication data may then be further processed and a hash may be generated (e.g., #EncryptedAuthHashBank1) for the encrypted authentication data associated with the first user profile data received from the first external entity. The hash may be stored in a database for later user in authenticating the user at step 324.

At step 325, a connection may be established between the external entity computing system 145 and the account linking and control computing platform 110. For instance, a fifth wireless connection may be established between the account linking and control computing platform 110 and external entity computing system 145. Upon establishing the fifth wireless connection, a communication session may be initiated between account linking and control computing platform 110 and external entity computing system 145.

At step 326, the request for user/customer profile data may be transmitted by the account linking and control computing platform 110 to the external entity computing system 145. For instance, the request for user profile data may be transmitted during the communication session initiated upon establishing the fifth wireless connection. In some examples, external entity computing system 145 may be associated with a second external entity different from the enterprise organization and different from the first external entity (e.g., second financial institution different from the enterprise organization and firth financial institution).

At step 327 external entity computing system 145 may receive the request for user profile data and may execute the request to retrieve the requested data.

With reference to FIG. 3F, at step 328, second profile data may be transmitted by the external entity computing system 145 to the account linking and control computing platform 110.

At step 329, the account linking and control computing platform 110 may receive the second profile data (which may, e.g., be associated with a second payment device of the user provided during the registration process and different from the first payment device).

At step 330, the second user profile data may be processed. In some examples, process the second user profile data may include segregating the raw customer data (e.g., account data, identifying data, and the like) from encrypted authentication data. The encrypted authentication data may then be further processed and a hash may be generated (e.g., #EncryptedAuthHashBank2) for the encrypted authentication data associated with the second user profile data received from the second external entity. The hash may be stored in a database for later user in authenticating the user at step 331.

At step 332, a dynamic rendering of devices associated with the user and for which user profile data has been received may be generated. For instance, account linking and control computing platform 110 may dynamically render images of a plurality of payment devices or images representing payment devices associated with the user and for which user profile data has been received. Accordingly, in some examples, if a request for user profile data is transmitted but no response is received, that payment device might not be displayed on the user interface, even if the user has identified that device as associated with the user during the registration process. Accordingly, in some examples, the user interface may be dynamically generated to reflect only those devices associated with entities from which user profile data was received.

Figure 3G:
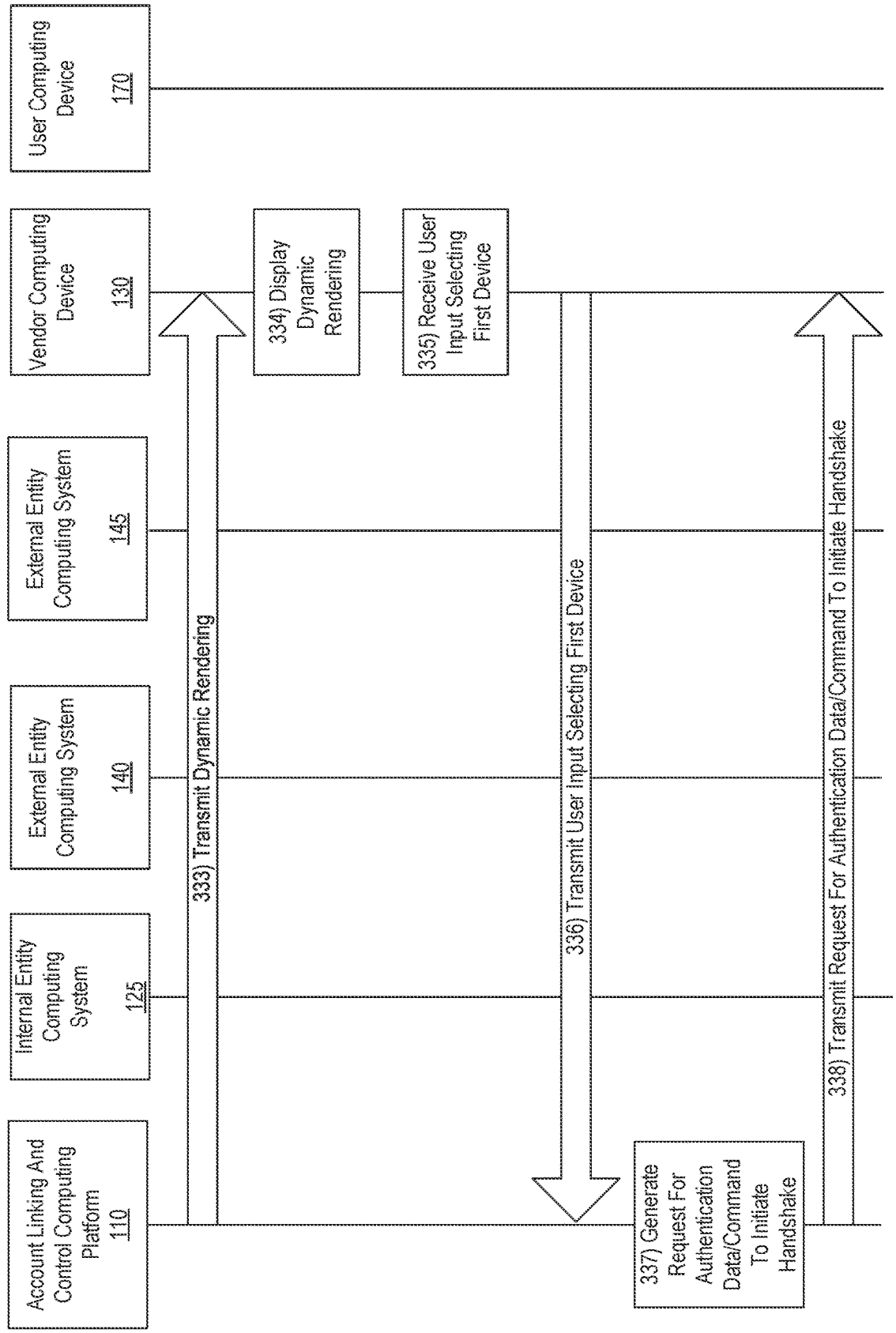

With reference to FIG. 3G, at step 333, the account linking and control computing platform 110 may transmit the dynamic rendering to the vendor computing device 130. At step 334, the dynamic rendering may be displayed by a display of the vendor computing device 130.

At step 335, user input selecting one device of the devices displayed on the dynamic rendering may be received. For instance, a user may provide (e.g., via a touch screen, key pad or other input device) input selecting one payment device of the plurality of payment devices displayed via the dynamic rendering.

At step 336, the received user input or selection may be transmitted by the vendor computing device 130 to the account linking and control computing platform 110.

In response to receiving the selection of a payment device from the plurality of payment devices displayed, a request for authentication data and/or an instruction to initiate a handshake protocol may be generated at step 337. For instance, the selected device may be mapped to registration data provided and customer or user profile data received from an external entity associated with the selected payment device. Accordingly, a request for authentication data (e.g., associated with the selected device) and/or an instruction to initiate a handshake protocol between the vendor computing device 130 and user mobile device (e.g., user computing device 170) may be generated. In some examples, the instruction to initiate the handshake protocol may include identifying data associated with the user computing device 170 that was provided, e.g., during registration. The handshake protocol may be used as a primary or secondary form of authentication of the user (e.g., if the handshake between the vendor computing device 130 and the pre-stored user computing device 170 is successful, the device is within range of the vendor computing device 130 and the user is likely an authorized user).

At step 338, the generated request for authentication data and/or instruction to initiate a handshake protocol may be transmitted by the account linking and control computing platform 110 to the vendor computing device 130.

Figure 3H:
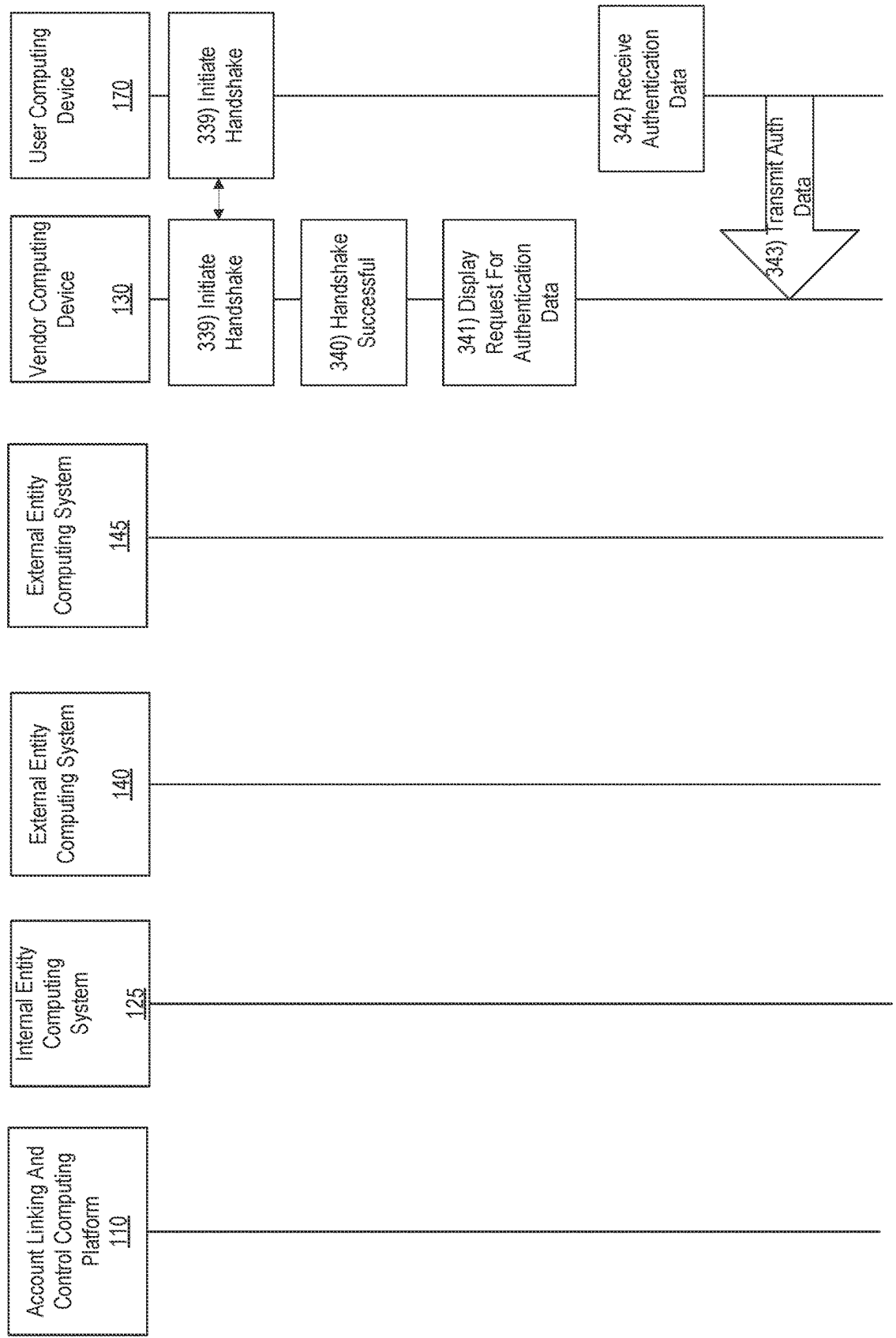

With reference to FIG. 3H, at step 339 a handshake protocol may be initiated between the vendor computing device 130 and the user computing device 170. If the handshake is successful, communication may be established between the vendor computing device 130 and the user computing device 170 at step 340. Accordingly, the successful handshake may be considered one factor of multi-factor authentication to use the arrangements described herein. In addition, the established communication session may enable a user to provide authentication information via the mobile device (e.g., user computing device 170).

For instance, at step 341, the generated request for authentication data may be displayed by a display of the vendor computing device 130. For instance, a request for authentication data may include an image or name of the selected payment device. The user may be requested to provide authentication data for the selected payment device. For instance, a user may be requested to input a password, personal identification number (PIN), biometric data, or the like associated with authentication of the selected device.

In some examples, the user may provide the authentication data via the mobile device (e.g., user computing device 170) at step 342. For instance, a user may view the request for authentication data via the vendor computing device 130 display and provide the authentication data via the user computing device 170. The authentication data may be securely transmitted to the vendor computing device 130 via the communication session established via the handshake process at step 343.

In some arrangements (e.g., arrangements in which an instruction to initiate a handshake protocol is not generated and transmitted) authentication data may be provided via the vendor computing device 130. In these arrangements, steps 339 and 340 may be omitted.

Figure 3I:
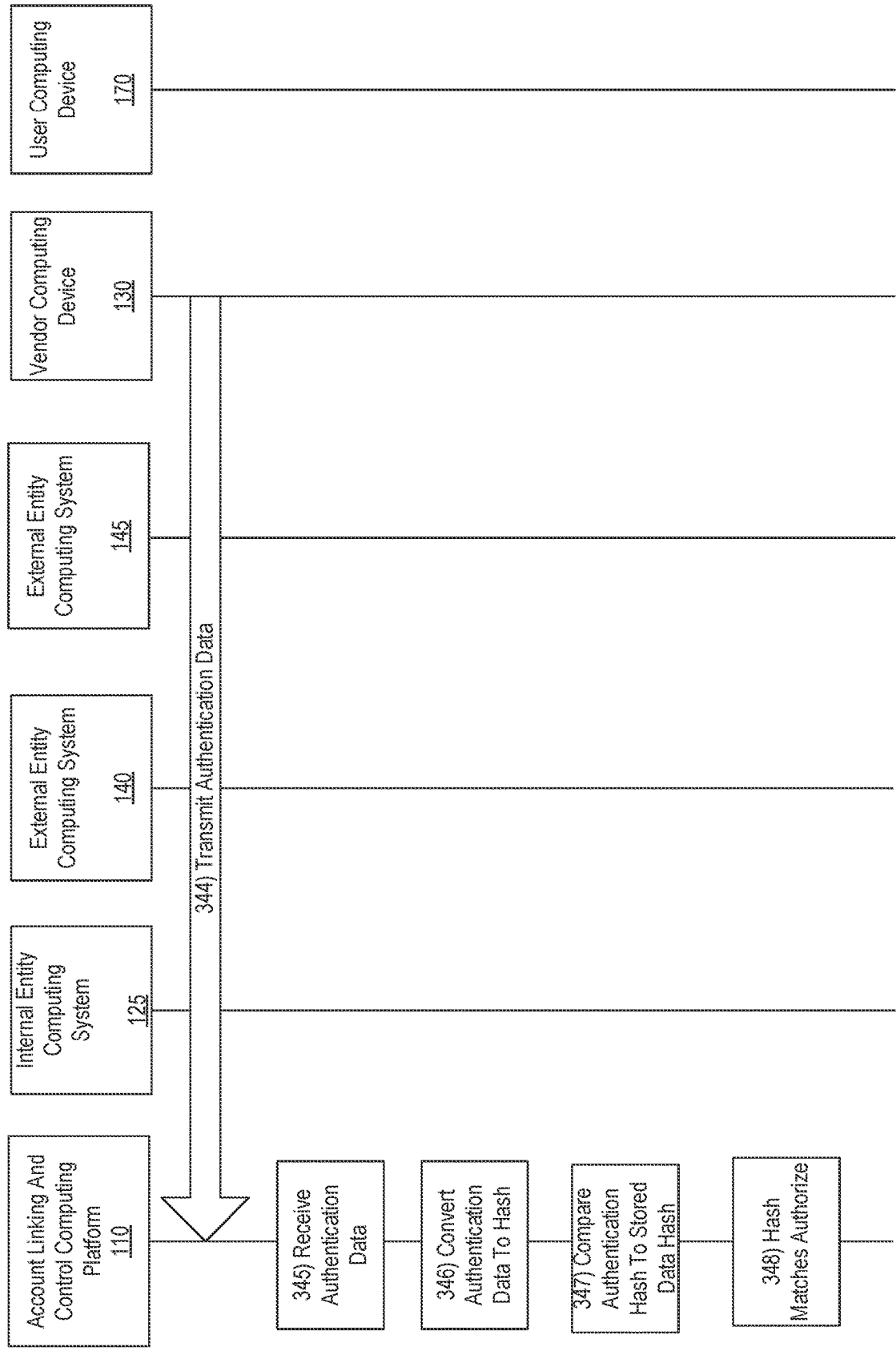

With reference to FIG. 3I, at step 344 the authentication data may be transmitted by the vendor computing device 130 to the account linking and control computing platform 110. At step 345, the authentication data may be received by the account linking and control computing platform 110.

At step 346, the authentication data received from the user (e.g., via user computing device 170 and/or vendor computing device 130) may be processed. In some examples, processing the received authentication data may include generating an encrypted hash of the authentication data (e.g., #EncryptedAuthHashVendor).

At step 347, the encrypted hash of the authentication data received from the user (e.g., #EncryptedAuthHashVendor) may be compared to encrypted hashes stored in a database and generated from user profile data received from one or more external entities (e.g., #EncryptedAuthHashBank1 or the like). In some examples, the hash of the authentication data received from the user may be compared to the hash of the encrypted authentication data received from the external entity associated with the selected device.

At step 348, if the hash generated from the authentication data received from the user matches the stored hash data generated from the user profile data, the requested transaction may be authorized. For instance, the user may be authorized to conduct one or more transactions via the point-of-sale device (e.g., vendor computing device 130) even if the card or device associated with the account with which the user is transacting is not present, has not been used to initiate the transaction, or the like.

Figure 3J:
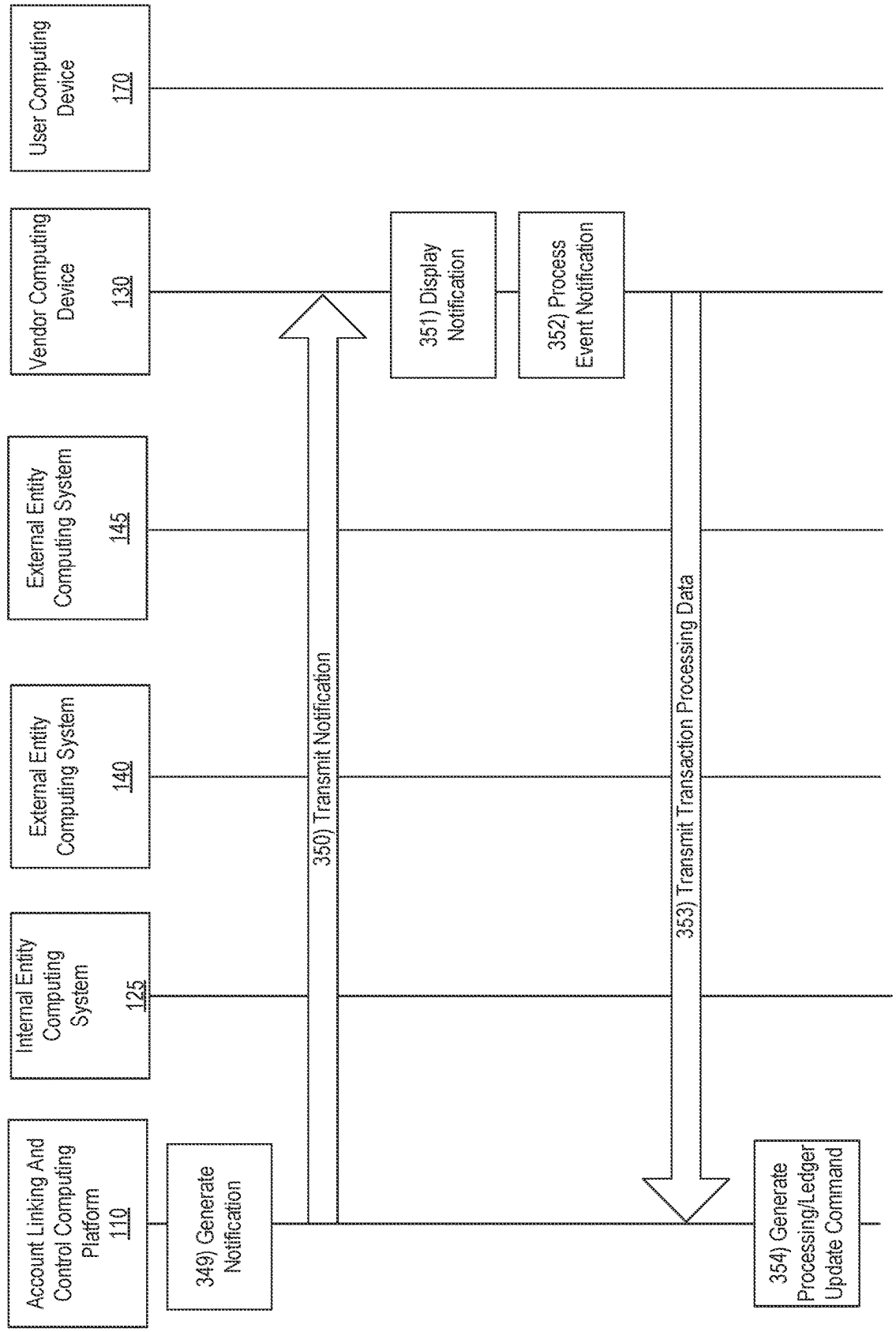

With reference to FIG. 3J, at step 349, a notification indicating authentication of the user may be generated by the account linking and control computing platform 110.

At step 350, the generated notification may be transmitted to the vendor computing device 130. At step 351, the notification may be displayed by a display of the vendor computing device 130.

At step 352, the vendor computing device 130 may process the requested transaction (e.g., complete a purchase). In response to processing the transaction, transaction data may be transmitted to the account linking and control computing platform at step 353.

At step 354, account linking and control computing platform may receive the transaction processing data and generate processing and/or ledger update commands. For instance, the user may process the desired transactions via the vendor computing device 130 and data associated with the transaction(s) (e.g., amount, type of transaction and the like) may be transmitted to the account linking and control computing platform 110 for processing, transmission to one or more external entity systems, or the like. Based on the received transaction data, one or more processing and/or ledger update commands may be generated.

With reference to FIG. 3K, at step 355, the processing and/or ledger update commands may be transmitted to one or more external entity computing systems 140, 145. For instance, the generated commands may be transmitted to the external entity computing system associated with the selected payment device used for the transactions. The commands may be received by the entity system and executed.

Figure 4:
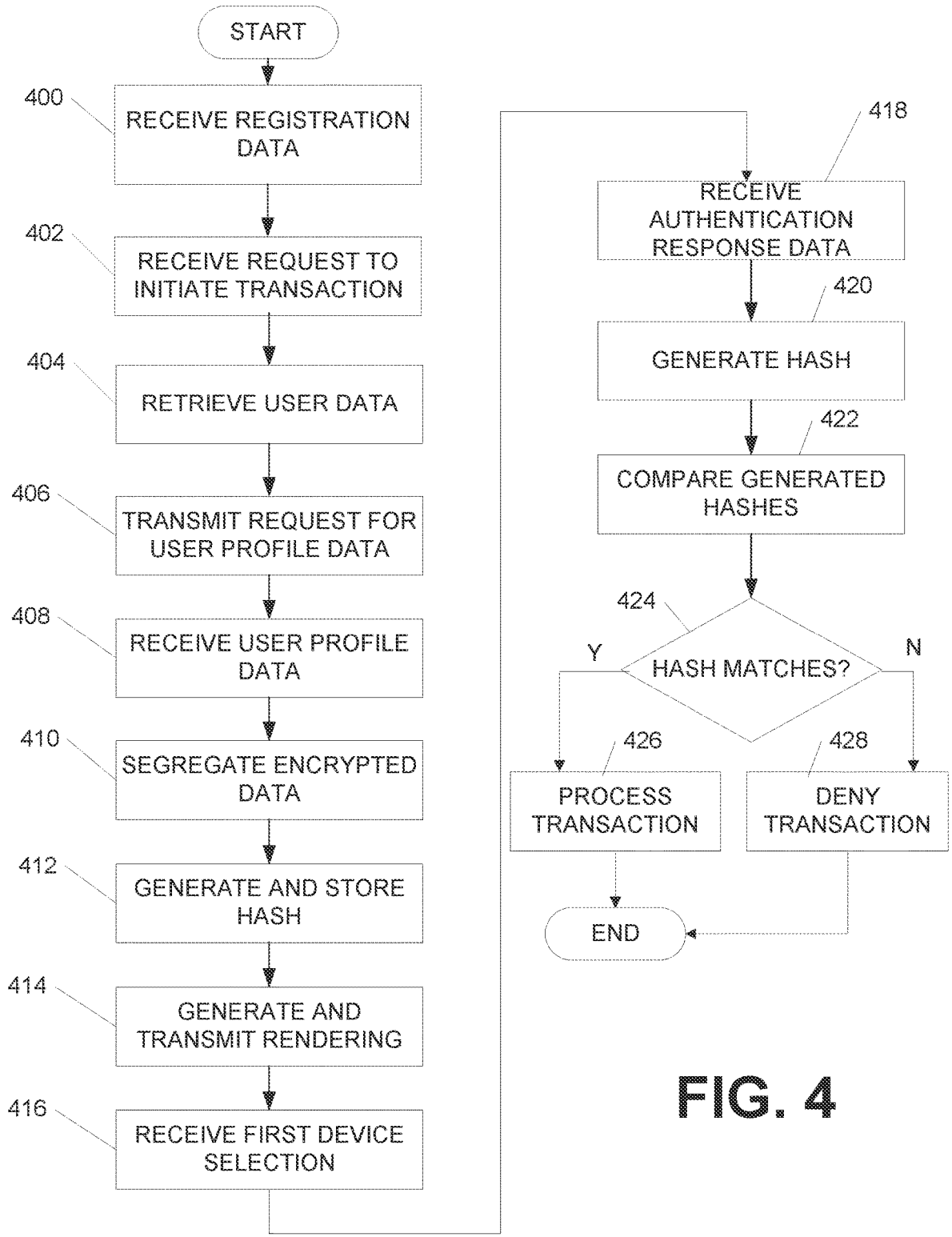
FIG. 4 illustrates an illustrative method for implementing account linking and dynamic device selection functions according to one or more aspects described herein.

FIG. 4 is a flow chart illustrating one example method of account linking and dynamic authentication and device selection according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, registration data and/or a registration request may be received from a user computing device, such as user computing device 170. In some examples, the registration data may include user identifying data, user device identifying data, user account data, user payment device data, and the like. In some examples, the user account data and/or user payment device data may be associated with one or more user accounts or user payment devices provided by or otherwise associated with an external entity different from the enterprise organization implementing the account linking and control computing platform 110. For instance, a first financial institution may implement the account linking and control computing platform 110 and may receive user registration data including one or more accounts held at one or more other financial institutions, one or more payment devices (e.g., debit card, credit card, or the like) provided by or associated with other financial institutions, and the like.

At step 402, a request for to initiate a transaction may be received. For instance, a user may initiate a transaction at a self-service kiosk, such as an ATM, ATA, or the like. Initiating the transaction may include inserting a payment card or other device into the self-service kiosk, bringing the card or device within a predefined proximity of the self-service device such that the card or device can be detected by the self-service kiosk (e.g., via near-field communication, Bluetooth™ or the like), a user may select an option on the self-service kiosk to initiate the transaction, or the like. Initiation of the transaction at the self-service kiosk may be transmitted to the account linking and control computing platform 110 to initiate or activate one or more functions.

In some examples, the request for event processing may include user and/or account identifying information (e.g., user data extracted from a card or payment device detected by the self-service kiosk, user input provided by the user, or the like). This information may be used to identify a user and confirm that the user is a registered user. If not, the system may proceed via conventional processing methods.

If the user is a registered user, user information may be retrieved (e.g., user information provided during the registration process and including, for instance, a plurality of accounts and/or payment devices associated with the user) at step 404. This information may be used to identify one or more external entities from which to request user or customer data. For instance, one or more financial institutions associated with the plurality of accounts and/or devices may be identified from the registration data.

At step 406, requests for user profile may be generated and transmitted to the external entities associated with the plurality of user accounts and/or devices. For instance, a call to the respective external entities associated with each device or account may be made using secure API call methods to request user or customer profile data.

At step 408, the customer or user profile data may be received and processed. In some examples, customer profile data may include raw user data such as user identifying data, user account data, and the like, as well as encrypted authentication data.

At step 410, the encrypted authentication data may be segregated from the remaining user profile data (e.g., raw customer data).

At step 412, an encrypted hash of the encrypted authentication data may be generated and stored by the account linking and control computing platform 110. For instance, an encrypted hash may be generated for encrypted authentication data received from each entity or associated with each device or account (e.g., #EncryptedAuthHashBank1 may represent the hash associated with a first device or account at Bank 1, #EncryptedAuthHashBank2 may represent the hash associated with a second device or account at Bank 2, and the like) The generated hashes may be stored (e.g., in an encrypted authentication hash database).

At step 414, account linking and control computing platform 110 may dynamically generate a rendering of the devices or accounts for which user profile data was received. For instance, if responses including user profile data were received for all requested devices or accounts the rendering may include all devices or accounts (e.g., an image of each card, a name of an account, or the like). Additionally or alternatively, if user profile data was received from fewer than all accounts or devices, the rendering may only include the devices or accounts for which user profile data was received. Accordingly, by dynamically generating the rendering for each transaction request the rendering may include only devices available for selection.

The rendering may be transmitted to a device, such as an entity computing device 150, and displayed by the device. At step 416, user input may be received via the entity computing device 150 selecting a first payment device from the rendering of available devices and accounts.

At step 418, authentication response data associated with authentication of the selected first payment device may be received. For instance, the user may provide an authentication token via the entity computing device 150 (e.g., one-time passcode, personal identification number (PIN), password, biometric data, or the like). The authentication token may be transmitted to and received by the account linking and control computing platform 110.

At step 420, a hash of the authentication response data may be generated. For instance, an encrypted hash of the authentication response data may be generated and, at step 422, compared to the stored hash of the encrypted authentication data received with the user profile for the selected first payment device.

At step 424, a determination may be made as to whether the hashes match. If so, the transaction may be processed at step 426. If not, the transaction may be denied at step 428.

Figure 5:
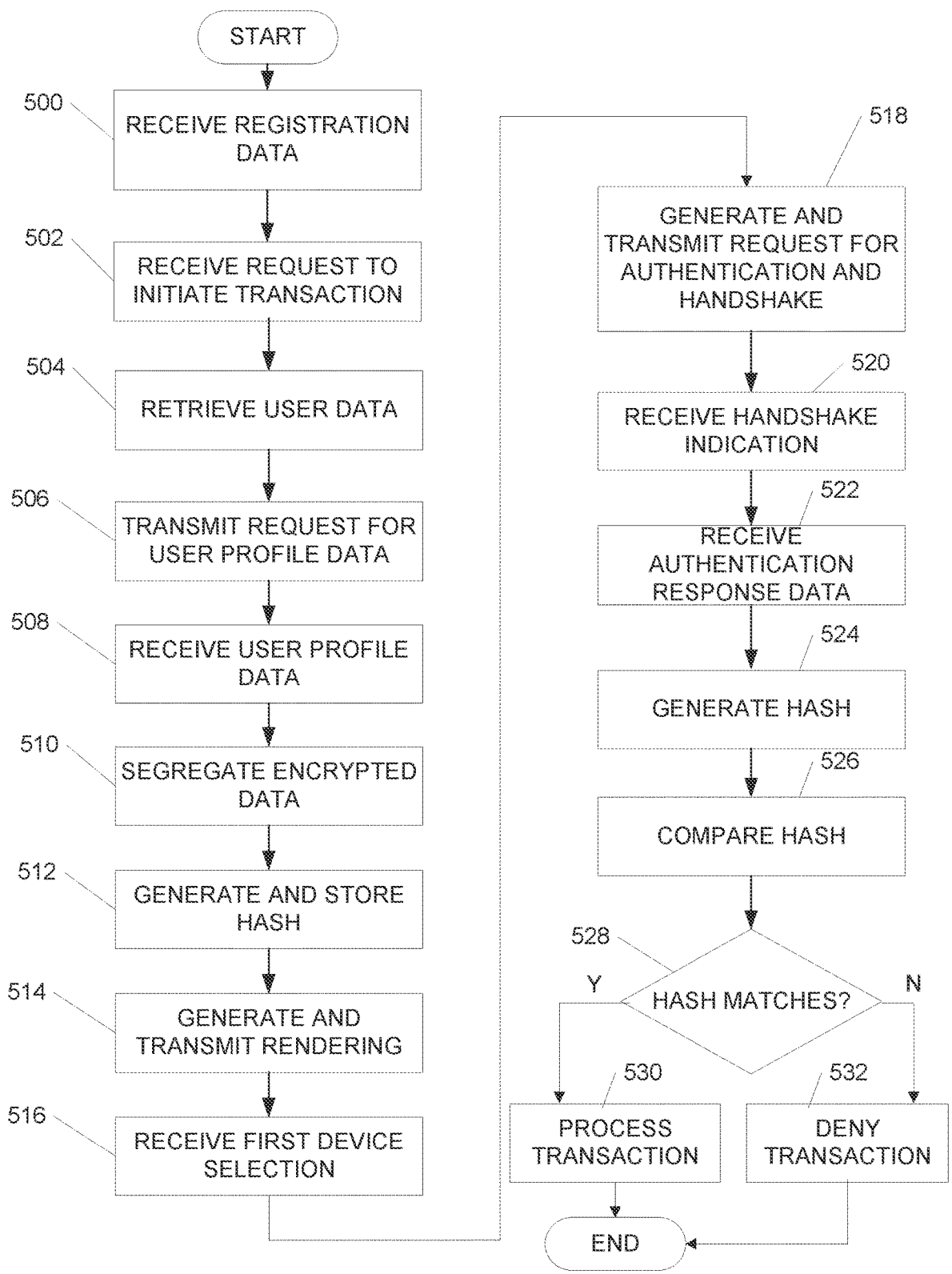
FIG. 5 illustrates another illustrative method for implementing account linking and dynamic device selection functions according to one or more aspects described herein.

FIG. 5 is a flow chart illustrating another example method of account linking and dynamic authentication and event processing according to one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 5 may be performed in real-time or near real-time.

At step 500, registration data and/or a registration request may be received from a user computing device, such as user computing device 170. In some examples, the registration data may include user identifying data, user device identifying data, user account data, user payment device data, and the like. In some examples, the user account data and/or user payment device data may be associated with one or more user accounts or user payment devices provided by or otherwise associated with an external entity different from the enterprise organization implementing the account linking and control computing platform 110. For instance, a first financial institution may implement the account linking and control computing platform 110 and may receive user registration data including one or more accounts held at one or more other financial institutions, one or more payment devices (e.g., debit card, credit card, or the like) provided by or associated with other financial institutions, and the like.

At step 502, a request to initiate a transaction may be received. For instance, a user may initiate a transaction, such as a purchase, at a vendor computing device, such as a point-of-sale system. Initiating the transaction may include inserting a payment card or other device into the vendor computing device 130, bringing the card or device within a predefined proximity of the vendor computing device 130 such that the card or device can be detected by the vendor computing device 130 (e.g., via near-field communication, Bluetooth™ or the like), a user may select an option on the vendor computing device 130 to initiate the transaction, or the like. Initiation of the transaction at the vendor computing device 130 may be transmitted to the account linking and control computing platform 110 to initiate or activate one or more functions.

In some examples, the request for transaction may include user and/or account identifying information (e.g., user data extracted from a card or payment device detected by the vendor computing device 130, user input provided by the user, or the like). This information may be used to identify a user and confirm that the user is a registered user. If not, the system may proceed via conventional processing methods.

If the user is a registered user, user information may be retrieved (e.g., user information provided during the registration process and including, for instance, a plurality of accounts and/or payment devices associated with the user) at step 504. This information may be used to identify one or more external entities from which to request user or customer data. For instance, one or more financial institutions associated with the plurality of accounts and/or devices may be identified from the registration data.

At step 506, requests for user profile data may be generated and transmitted to the external entities associated with the plurality of user accounts and/or devices. For instance, a call to the respective external entities associated with each device or account may be made using secure API call methods to request user or customer profile data.

At step 508, the customer or user profile data may be received and processed. In some examples, customer profile data may include raw customer data such as user identifying data, user account data, and the like, as well as encrypted authentication data.

At step 510, the encrypted authentication data may be segregated from the remaining user profile data (e.g., raw customer data).

At step 512, an encrypted hash of the encrypted authentication data may be generated and stored by the account linking and control computing platform 110. For instance, an encrypted hash may be generated for encrypted authentication data received from each entity or associated with each device or account (e.g., #EncryptedAuthHashBank1 may represent the hash associated with a first device or account at Bank 1, #EncryptedAuthHashBank2 may represent the hash associated with a second device or account at Bank 2, and the like) The generated hashes may be stored (e.g., in an encrypted authentication hash database).

At step 514, account linking and control computing platform 110 may dynamically generate a rendering of the devices or accounts for which user profile data was received. For instance, if responses including user profile data were received for all requested devices or accounts the rendering may include all devices or accounts (e.g., an image of each card, a name of an account, or the like). Additionally or alternatively, if user profile data was received from fewer than all accounts or devices, the rendering may only include the devices or accounts for which user profile data was received. Accordingly, by dynamically generating the rendering for each transaction request the rendering may include only devices available for selection.

The rendering may be transmitted to a device, such as an entity computing device 150, and displayed by the device. At step 516, user input may be received via the entity computing device 150 selecting a first payment device from the rendering of available devices and accounts.

At step 518, a request for user authentication data and/or an instruction to initiate a handshake protocol may be generated and transmitted to the vendor computing device 130. For instance, an instruction causing initiation of a handshake protocol between the vendor computing device 130 and user computing device 170 may be generated and transmitted. A request for authentication data may be generated and transmitted. The instructions and request may be received by the vendor computing device 130 and executed causing the handshake protocol to initiation and displaying the request for authentication data on a display of the vendor computing device.

At step 520, account linking and control computing platform 110 may receive an indication of successful handshake.

At step 522, authentication response data may be received. For instance, a user may provide an authentication token (e.g., one-time passcode, PIN, password, biometric data, or the like) via one of user computing device 170 or vendor computing device 130. In examples in which the authentication token is received via the user computing device 170, the authentication response data may be generated and transmitted to the vendor computing device 130 and to the account linking and control computing platform 110. The authentication data requested may include authentication data particular to the selected first payment device.

At step 524, a hash of the authentication response data may be generated. For instance, an encrypted hash of the authentication response data may be generated and, at step 526, compared to the stored hash of the encrypted authentication data received with the user profile for the selected first payment device.

At step 528, a determination may be made as to whether the hashes match. If so, the transaction may be processed at step 530. If not, the transaction may be denied at step 532.

As discussed herein, arrangements described enable user account and payment device linking to facilitate transaction processing via any linked account and with or without a particular device being physically present at the transaction location. For instance, as discussed herein, a user may register a plurality of payment devices and/or accounts. If a user initiates a transaction (e.g., ATM transaction, purchase, or the like) the user need not have all devices associated with all accounts physically present in the arrangements discussed herein. Instead, the user may initiate the transaction with a first device and may be presented with options to select the account associated with the first device and/or one or more accounts associated with other devices that may be associated with one or more other or external financial institutions. Accordingly, devices associated with a first bank, second bank, third bank, and the like may be provided for selection.

Upon selection of one of the devices, authentication data may be received and compared to previously received authentication data for that device. If the user is authenticated, the transaction may be processed (e.g., without the device being physically present). Accordingly, users may securely process transactions using any of their accounts or devices without carrying all devices with them. This may aid in reducing lost or stolen card, unauthorized activity, and the like.

Further, by generating a hash of encrypted user profile authentication data for use in authenticating the user, private user data may be secure and remain private. The enterprise organization implementing the system need not decrypt the data and instead may use hashed data for authentication of the user.

Figure 7:
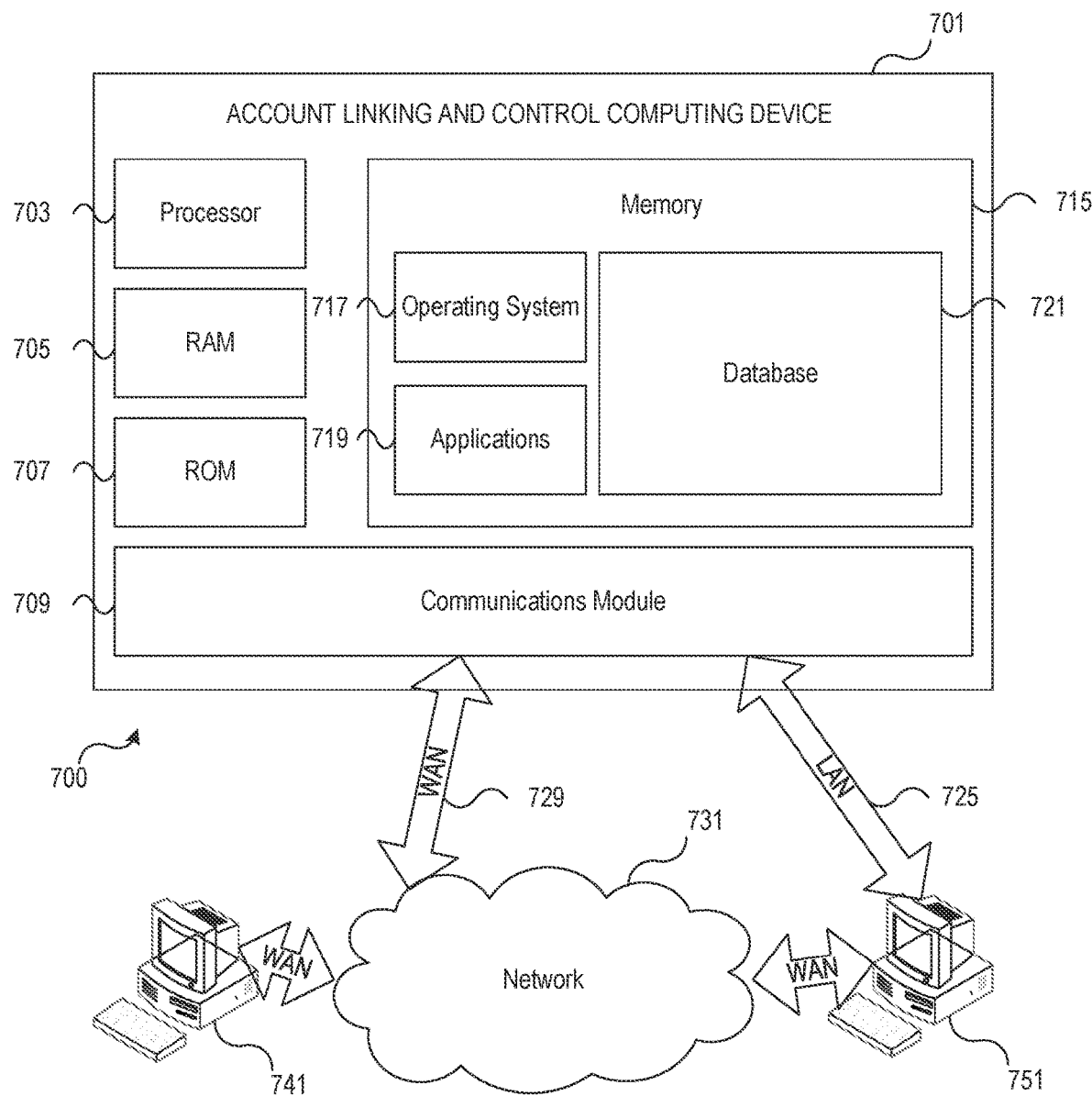
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. The arrangements described with respect to FIG. 7 may be applied any devices shown and described herein. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include account linking and control computing device 701 having processor 703 for controlling overall operation of account linking and control computing device 701 and its associated components, including Random Access Memory (RAM) 705, Read-Only Memory (ROM) 707, communications module 709, and memory 715. Account linking and control computing device 701 may include a variety of computer readable media. Computer readable media may be any available media that may be accessed by account linking and control computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by account linking and control computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on account linking and control computing device 701. Such a processor may execute computer-executable instructions stored on a computer-readable medium.

Software may be stored within memory 715 and/or storage to provide instructions to processor 703 for enabling account linking and control computing device 701 to perform various functions as discussed herein. For example, memory 715 may store software used by account linking and control computing device 701, such as operating system 717, application programs 719, and associated database 721. Also, some or all of the computer executable instructions for account linking and control computing device 701 may be embodied in hardware or firmware. Although not shown, RAM 705 may include one or more applications representing the application data stored in RAM 705 while account linking and control computing device 701 is on and corresponding software applications (e.g., software tasks) are running on account linking and control computing device 701.

Communications module 709 may include a microphone, keypad, touch screen, and/or stylus through which a user of account linking and control computing device 701 may provide input, and may also include one or more of a speaker for providing audio output and a video display device for providing textual, audiovisual and/or graphical output. Computing system environment 700 may also include optical scanners (not shown).

Account linking and control computing device 701 may operate in a networked environment supporting connections to one or more remote computing devices, such as computing devices 741 and 751. Computing devices 741 and 751 may be personal computing devices or servers that include any or all of the elements described above relative to account linking and control computing device 701.

The network connections depicted in FIG. 7 may include Local Area Network (LAN) 725 and Wide Area Network (WAN) 729, as well as other networks. When used in a LAN networking environment, account linking and control computing device 701 may be connected to LAN 725 through a network interface or adapter in communications module 709. When used in a WAN networking environment, account linking and control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive registration data, the registration data including data associated with a plurality of payment devices associated with a user, each payment device of the plurality of payment devices being associated with a respective entity;
        receive, via a vendor computing device, a request to initiate a transaction, the request to initiate the transaction including a customer identifier;

retrieve, based on the customer identifier, user information associated with the user;
transmit, via a secure application programming interface (API) call method, a request for user profile data to each respective entity associated with each payment device of the plurality of payment devices;
receive, from each respective entity associated with each payment device of the plurality of payment devices, user profile data, the user profile data including encrypted authentication data associated with each respective payment device and raw user data;
segregate the encrypted authentication data from the raw user data for each user profile received;
generate, for each user profile received, an encrypted hash of the segregated encrypted authentication data;
store, for each user profile received, the encrypted hash of the segregated encrypted authentication data;
dynamically generate a rendering including each payment device of the plurality of payment devices;
transmit the rendering to the vendor computing device;
receive, from the vendor computing device, selection of a first payment device of the plurality of payment devices;
generate a request for user authentication data and instruction to initiate a handshake protocol between the vendor computing device and a user computing device;
transmit the request for user authentication data and instruction to initiate the handshake protocol to the vendor computing device;
receive an indication that the handshake protocol was successful;
receive, from one of the vendor computing device and the user computing device, authentication response data;
generate an encrypted hash of the authentication response data;
compare the encrypted hash of the authentication response data to an encrypted hash of the segregated encrypted authentication data for the first payment device;
responsive to determining that the encrypted hash of the authentication response data matches the encrypted hash of the segregated encrypted authentication data for the first payment device, process the transaction; and
responsive to determining that the encrypted hash of the authentication response data does not match the encrypted hash of the segregated encrypted authentication data for the first payment device, deny the transaction.

2. The computing platform of claim 1, wherein the vendor computing device is a point-of-sale system.

3. The computing platform of claim 1, wherein the computing platform is associated with a first entity, the vendor computing device is associated with a second entity different from the first entity and the first payment device is associated with a third entity different from the first entity and the second entity.

4. The computing platform of claim 1, wherein the raw user data includes user identifying information and account information for an account associated with each payment device.

5. The computing platform of claim 1, wherein the authentication response data is received from the user computing device and is transmitted to the computing platform via the vendor computing device.

6. The computing platform of claim 1, wherein the user information includes the registration data.

7. The computing platform of claim 1, further including instructions that, when executed, cause the computing platform to:
generate an account ledger update instruction; and
transmit the account ledger update instruction to the respective entity associated with the first payment device.

8. A method, comprising:
receiving, by a computing platform, the computing platform having at least one processor and memory registration data, the registration data including data associated with a plurality of payment devices associated with a user, each payment device of the plurality of payment devices being associated with a respective entity;
receiving, by the at least one processor and via a vendor computing device, a request to initiate a transaction, the request to initiate the transaction including a customer identifier;
retrieving, by the at least one processor and based on the customer identifier, user information associated with the user;
transmitting, by the at least one processor and via a secure application programming interface (API) call method, a request for user profile data to each respective entity associated with each payment device of the plurality of payment devices;
receiving, by the at least one processor and from each respective entity associated with each payment device of the plurality of payment devices, user profile data, the user profile data including encrypted authentication data associated with each respective payment device and raw user data;
segregating, by the at least one processor, the encrypted authentication data from the raw user data for each user profile received;
generating, by the at least one processor and for each user profile received, an encrypted hash of the segregated encrypted authentication data;
storing, by the at least one processor and for each user profile received, the encrypted hash of the segregated encrypted authentication data;
dynamically generating, by the at least one processor, a rendering including each payment device of the plurality of payment devices;
transmitting, by the at least one processor, the rendering to the vendor computing device;
receiving, by the at least one processor and from the vendor computing device, selection of a first payment device of the plurality of payment devices;
generating, by the at least one processor, a request for user authentication data and instruction to initiate a handshake protocol between the vendor computing device and a user computing device;
transmitting, by the at least one processor, the request for user authentication data and instruction to initiate the handshake protocol to the vendor computing device;
receiving, by the at least one processor, an indication that the handshake protocol was successful;
receiving, by the at least one processor and from one of the vendor computing device and the user computing device, authentication response data;

generating, by the at least one processor, an encrypted hash of the authentication response data;

comparing, by the at least one processor, the encrypted hash of the authentication response data to an encrypted hash of the segregated encrypted authentication data for the first payment device;

when it is determined that the encrypted hash of the authentication response data matches the encrypted hash of the segregated encrypted authentication data for the first payment device, processing, by the at least one processor, the transaction; and when it is determined that the encrypted hash of the authentication response data does not match the encrypted hash of the segregated encrypted authentication data for the first payment device, denying, by the at least one processor, the transaction.

9. The method of claim 8, wherein the vendor computing device is a point-of-sale system.

10. The method of claim 8, wherein the computing platform is associated with a first entity, the vendor computing device is associated with a second entity different from the first entity and the first payment device is associated with a third entity different from the first entity and the second entity.

11. The method of claim 8, wherein the raw user data includes user identifying information and account information for an account associated with each payment device.

12. The method of claim 8, wherein the authentication response data is received from the user computing device and is transmitted to the computing platform via the vendor computing device.

13. The method of claim 8, wherein the user information includes the registration data.

14. The method of claim 8, further including:
generate an account ledger update instruction; and
transmit the account ledger update instruction to the respective entity associated with the first payment device.

15. One or more non-transitory computer-readable media storing instructions that, when executed by a computing platform comprising at least one processor, memory, and a communication interface, cause the computing platform to:
receive registration data, the registration data including data associated with a plurality of payment devices associated with a user, each payment device of the plurality of payment devices being associated with a respective entity;
receive, via a vendor computing device, a request to initiate a transaction, the request to initiate the transaction including a customer identifier;
retrieve, based on the customer identifier, user information associated with the user;
transmit, via a secure application programming interface (API) call method, a request for user profile data to each respective entity associated with each payment device of the plurality of payment devices;
receive, from each respective entity associated with each payment device of the plurality of payment devices, user profile data, the user profile data including encrypted authentication data associated with each respective payment device and raw user data;
segregate the encrypted authentication data from the raw user data for each user profile received;
generate, for each user profile received, an encrypted hash of the segregated encrypted authentication data;
store, for each user profile received, the encrypted hash of the segregated encrypted authentication data;
dynamically generate a rendering including each payment device of the plurality of payment devices;
transmit the rendering to the vendor computing device;
receive, from the vendor computing device, selection of a first payment device of the plurality of payment devices;
generate a request for user authentication data and instruction to initiate a handshake protocol between the vendor computing device and a user computing device;
transmit the request for user authentication data and instruction to initiate the handshake protocol to the vendor computing device;
receive an indication that the handshake protocol was successful;
receive, from one of the vendor computing device and the user computing device, authentication response data;
generate an encrypted hash of the authentication response data;
compare the encrypted hash of the authentication response data to an encrypted hash of the segregated encrypted authentication data for the first payment device;
responsive to determining that the encrypted hash of the authentication response data matches the encrypted hash of the segregated encrypted authentication data for the first payment device, process the transaction; and
responsive to determining that the encrypted hash of the authentication response data does not match the encrypted hash of the segregated encrypted authentication data for the first payment device, deny the transaction.

16. The one or more non-transitory computer-readable media of claim 15, wherein the vendor computing device is a point-of-sale system.

17. The one or more non-transitory computer-readable media of claim 15, wherein the computing platform is associated with a first entity, the vendor computing device is associated with a second entity different from the first entity and the first payment device is associated with a third entity different from the first entity and the second entity.

18. The one or more non-transitory computer-readable media of claim 15, wherein the raw user data includes user identifying information and account information for an account associated with each payment device.

19. The one or more non-transitory computer-readable media of claim 15, wherein the authentication response data is received from the user computing device and is transmitted to the computing platform via the vendor computing device.

20. The one or more non-transitory computer-readable media of claim 15, wherein the user information includes the registration data.

21. The one or more non-transitory computer-readable media of claim 15, further including instructions that, when executed, cause the computing platform to:
generate an account ledger update instruction; and
transmit the account ledger update instruction to the respective entity associated with the first payment device.

* * * * *